United States Patent
Wheeler et al.

(10) Patent No.: US 12,199,936 B2
(45) Date of Patent: Jan. 14, 2025

(54) MULTIPARTY COMMUNICATION USING A LARGE LANGUAGE MODEL INTERMEDIARY

(71) Applicant: M3G Technology, Inc., San Francisco, CA (US)

(72) Inventors: Clay Young Wheeler, Johnson City, TN (US); Douglas Edward Marinaro, Santa Clara, CA (US)

(73) Assignee: M3G Technology, Inc., San Francisco, CA (US)

( * ) Notice: Subject to any disclaimer, the term of this patent is extended or adjusted under 35 U.S.C. 154(b) by 0 days.

(21) Appl. No.: 18/642,785

(22) Filed: Apr. 22, 2024

(65) Prior Publication Data
US 2024/0356881 A1    Oct. 24, 2024

Related U.S. Application Data

(60) Provisional application No. 63/461,068, filed on Apr. 21, 2023.

(51) Int. Cl.
| | |
|---|---|
| *H04L 51/216* | (2022.01) |
| *G06F 40/186* | (2020.01) |
| *G06F 40/211* | (2020.01) |
| *G06F 40/284* | (2020.01) |
| *G06F 40/35* | (2020.01) |
| *G06F 40/40* | (2020.01) |

(Continued)

(52) U.S. Cl.
CPC .......... *H04L 51/216* (2022.05); *G06F 40/186* (2020.01); *G06F 40/211* (2020.01); *G06F 40/284* (2020.01); *G06F 40/35* (2020.01); *G06F 40/40* (2020.01); *H04L 51/02* (2013.01); *H04L 51/224* (2022.05)

(58) Field of Classification Search
None
See application file for complete search history.

(56) References Cited

U.S. PATENT DOCUMENTS

| | | | |
|---|---|---|---|
| 12,001,550 B1* | 6/2024 | Schindel | G06F 21/554 |
| 2024/0145056 A1* | 5/2024 | Maharjan | G16H 15/00 |
| 2024/0202464 A1* | 6/2024 | Poirier | G06F 16/345 |

OTHER PUBLICATIONS

OpenAI. "GPT-4 Technical Report." ArXiv abs/2303.08774 (2023), https://cdn.openai.com/papers/gpt-4.pdf—Mar. 27, 2023.

* cited by examiner

*Primary Examiner* — Lance Leonard Barry
(74) *Attorney, Agent, or Firm* — Georgiy L. Khayet

(57) ABSTRACT

A method for providing multiparty communication using a large language model (LLM) is provided. The method commences with receiving input messages from user devices associated with a plurality of communication parties participating in a scenario. The method proceeds with generating a text input prompt for the LLM based on a scenario template. The method further includes sending the text input prompt to the LLM. The LLM analyzes the text input prompt to compose a response output of the LLM. The method proceeds with analyzing the response output of the LLM to generate output messages to be sent to one or more communication parties of the plurality of communication parties. The method further includes sending the output messages to the user devices associated with the one or more communication parties of the plurality of communication parties from a communication endpoint representing the LLM.

30 Claims, 15 Drawing Sheets

(51) Int. Cl.
*H04L 51/02* (2022.01)
*H04L 51/224* (2022.01)

Prompt 902

| Activity 904 |
|---|
| Number of Parties 906 |
| Scenario and Roles 908 |
| Role of the Bot in the Scenario (Bot Role) 910 |
| Limits to Prevent Hallucination - Hallucination Limit 912 |
| Action to Take in Event of Limit - Hallucination Action 914 |
| Syntax Structure of Incoming Messages From a Computational Unit - Incoming Syntax Structure 916 |
| Syntax Structure of a Response to Be Sent to a Computational Unit - Response Syntax Structure 918 |
| Input Acknowledgements 920 |
| Prior Messages 922 |

| Component of Prompt 902 | Prompt 902 |
|---|---|
| Activity 904 | Today, You Will Be Helping to Facilitate a Conversation 1002 |
| Number of Parties 906 | Between Three Communication Parties 1004 |
| Scenario and Roles 908 | A Tow Dispatch Employee, a Tow Truck Driver, and a Customer in Need of Assistance 1006 |
| Role of the Bot in the Scenario (Bot Role) 910 | They Will Each Be Communicating With You, but not Each Other. That Is, You Are the "Middle-Man" in the Conversation. Your Job Is to Communicate to Each Party Whatever Information They Need as It Comes up in the Conversation 1008 |
| Limits to Prevent Hallucination - Hallucination Limit 912 | Or, If a Communication Party Asks for Information That Is Currently not Available in the Conversation 1010 |
| Action to Take in Event of Limit - Hallucination Action 914 | Draft a Message to Whichever Communication Party You Think Would Have This Information. If You Do not Think Any Communication Party Has This Information, Be Honest and Admit That You Do not Have the Answer 1012 |
| Syntax Structure of Incoming Messages From a Computational Unit - Incoming Syntax Structure 916 | Messages From the Customer Begin With "Customer:", Messages From the Driver Begin With "Driver:", and Messages From the Employee Begin With "Employee:" 1014 |
| Syntax Structure of a Response to Be Sent to a Computational Unit - Response Syntax Structure 918 | When You Draft a Message Make Sure It Starts With "Me to Driver:", "Me to Customer:", or "Me to Employee:", Depending on Whom You Wish to Send the Message to. If You Don't Think You Need to Draft a Message to Anyone, Just Respond With "%%%" 1016 |
| Input Acknowledgements 920 | Feel Free to Respond to More Than One Party at Once, With Messages Separated by Newlines. Be Certain to Do This Whenever the Customer Supplies You With New Information or Asks a Question 1018 |
| Prior Messages 922 | Note That You May Have Already Responded in the Conversation. Here Is the Conversation So Far:... 1020 |

| Example Dialog 1102 | | |
|---|---|---|
| Input Messages 1104 | Text Input Prompts to LLM 1106 | Response Outputs From LLM 1108 |
| First Input Message 1110 | First Text Input Prompt to LLM 1112 | First Response Output From LLM 1114 |
| Second Input Message 1116 | Second Text Input Prompt to LLM 1118 | Second Response Output From LLM 1120 |
| Third Input Message 1122 | Third Text Input Prompt to LLM 1124 | Third Response Output From LLM 1126 |
| Fourth Input Message 1128 | Fourth Text Input Prompt to LLM 1130 | Fourth Response Output From LLM 1132 |
| Fifth Input Message 1134 | Fifth Text Input Prompt to LLM 1136 | Fifth Response Output From LLM 1138 |
| Sixth Input Message 1140 | Sixth Text Input Prompt to LLM 1142 | Sixth Response Output From LLM 1144 |

| Component of Prompt 1306 | Tagging Prompt 1304 |
|---|---|
| Activity 1308 | Today, You Will Be Helping with a Conversation About a Delivery. |
| Number of Parties 1310 | (Implied) |
| Scenario and Roles 1312 | The People in the Conversation Are the Customer Receiving the Delivery, the Delivery Dispatcher, the Delivery Driver, and an Assistant That Mediates Between Them. |
| Role of the Bot in the Scenario 1314 | You Are Angie, a Customer Service Expert With 30 Years of Experience. Your Job Is to Use Your Expertise to Determine Whether Anyone Is Waiting on Anyone Else to Respond. |
| Prior Messages 922 | |
| Response Syntax Structure 1318 | Is Anyone Waiting for Anyone Else to Respond Right Now? Please Reply With a JSON Dictionary Containing the Keys "Customer", "Driver", and "Dispatcher", Each of Which Corresponds to a Boolean Value That Is True If Anyone Is Waiting on That Party to Respond, and False Otherwise. Do Not Respond With Any Other Text Besides the Dictionary. |

FIG. 13

MULTIPARTY COMMUNICATION USING A LARGE LANGUAGE MODEL INTERMEDIARY

CROSS-REFERENCE TO RELATED APPLICATIONS

The present application claims priority of U.S. Provisional Patent Application No. 63/461,068 filed on Apr. 21, 2023, entitled "MULTIPARTY COMMUNICATION USING A LARGE LANGUAGE MODEL INTERMEDIARY," which is incorporated herein by reference in its entirety for all purposes.

TECHNICAL FIELD

The present disclosure relates generally to communication systems, and more particularly to an architecture for multiparty communication and issue resolution using a large-scale language model, also known as a large language model (LLM), as an intermediary between communication parties, with the capability to selectively enable direct communications between the communication parties at the discretion of an authorized party.

BACKGROUND

In various situations, such as customer support or coordination of services, communications between multiple parties can become complex and difficult to manage. Traditional methods of facilitating communications, such as conference calls or group messaging, may not be efficient and can lead to miscommunications, delays, privacy concerns, and/or loss of control. There is a need for an improved system and method for providing, managing, and orchestrating multiparty communications while also providing an option for direct communications between the parties as needed.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

According to an example embodiment of the present disclosure, a system for providing multiparty communication using an LLM is provided. The system may include a processor and a memory storing instructions to be executed by the processor. The processor may be configured to receive input messages from user devices associated with a plurality of communication parties participating in a scenario. The LLM may be configured to understand the scenario. The processor may be further configured to generate a text input prompt for the LLM based on a scenario template. The scenario template may include rules to organize the input messages based on the scenario. The plurality of communication parties and the LLM may be assigned roles as participants in the scenario. The scenario template may include rules to instruct the LLM to analyze text input prompts and compute response outputs of the LLM as defined by a role of the LLM in the scenario. The processor may be further configured to send the text input prompt to the LLM. The LLM may analyze the text input prompt to compose a response output of the LLM. The processor may be further configured to analyze the response output of the LLM, based on a syntax structure provided in the scenario template for the LLM, to generate output messages to be sent to one or more communication parties of the plurality of communication parties. The one or more communication parties may be identified by a role of the one or more communication parties in the response output of the LLM. The processor may be further configured to send the output messages to the user devices associated with the one or more communication parties of the plurality of communication parties from a communication endpoint representing the LLM in the role of the LLM in the scenario.

According to an example embodiment of the present disclosure, a method for providing multiparty communication using an LLM is provided. The method may commence with receiving input messages from user devices associated with a plurality of communication parties participating in a scenario. The LLM may be configured to understand the scenario. The method may proceed with generating a text input prompt for the LLM based on a scenario template. The scenario template may include rules to organize the input messages based on the scenario. The plurality of communication parties and the LLM may be assigned roles as participants in the scenario. The scenario template may include rules to instruct the LLM to analyze text input prompts and compute response outputs of the LLM as defined by a role of the LLM in the scenario. The method may further include sending the text input prompt to the LLM. The LLM may analyze the text input prompt to compose a response output of the LLM. The method may proceed with analyzing the response output of the LLM, based on a syntax structure provided in the scenario template for the LLM, to generate output messages to be sent to one or more communication parties of the plurality of communication parties. The one or more communication parties may be identified by a role of the one or more communication parties in the response output of the LLM. The method may further include sending the output messages to the user devices associated with the one or more communication parties of the plurality of communication parties from a communication endpoint representing the LLM in the role of the LLM in the scenario.

According to yet another example embodiment of the present disclosure, the operations of the above-mentioned method are stored on a non-transitory computer-readable storage medium that includes instructions that, when implemented by one or more processors, perform the recited operations.

Other example embodiments of the disclosure and aspects will become apparent from the following description taken in conjunction with the following drawings.

BRIEF DESCRIPTION OF THE DRAWINGS

Exemplary embodiments are illustrated by way of example and not limitation in the figures of the accompanying drawings, in which like references indicate similar elements.

FIG. 9 is a schematic diagram illustrating key components of a prompt composed for and provided to the LLM, according to an example embodiment.

FIG. 10 is a schematic diagram illustrating various components of a prompt, according to an example embodiment.

FIG. 11 illustrates an example dialog supported by a system for providing multiparty communication using an LLM, according to an example embodiment.

FIG. 13 shows a schematic diagram illustrating various components of the tagging prompt, according to an example embodiment.

DETAILED DESCRIPTION

Figure 1:
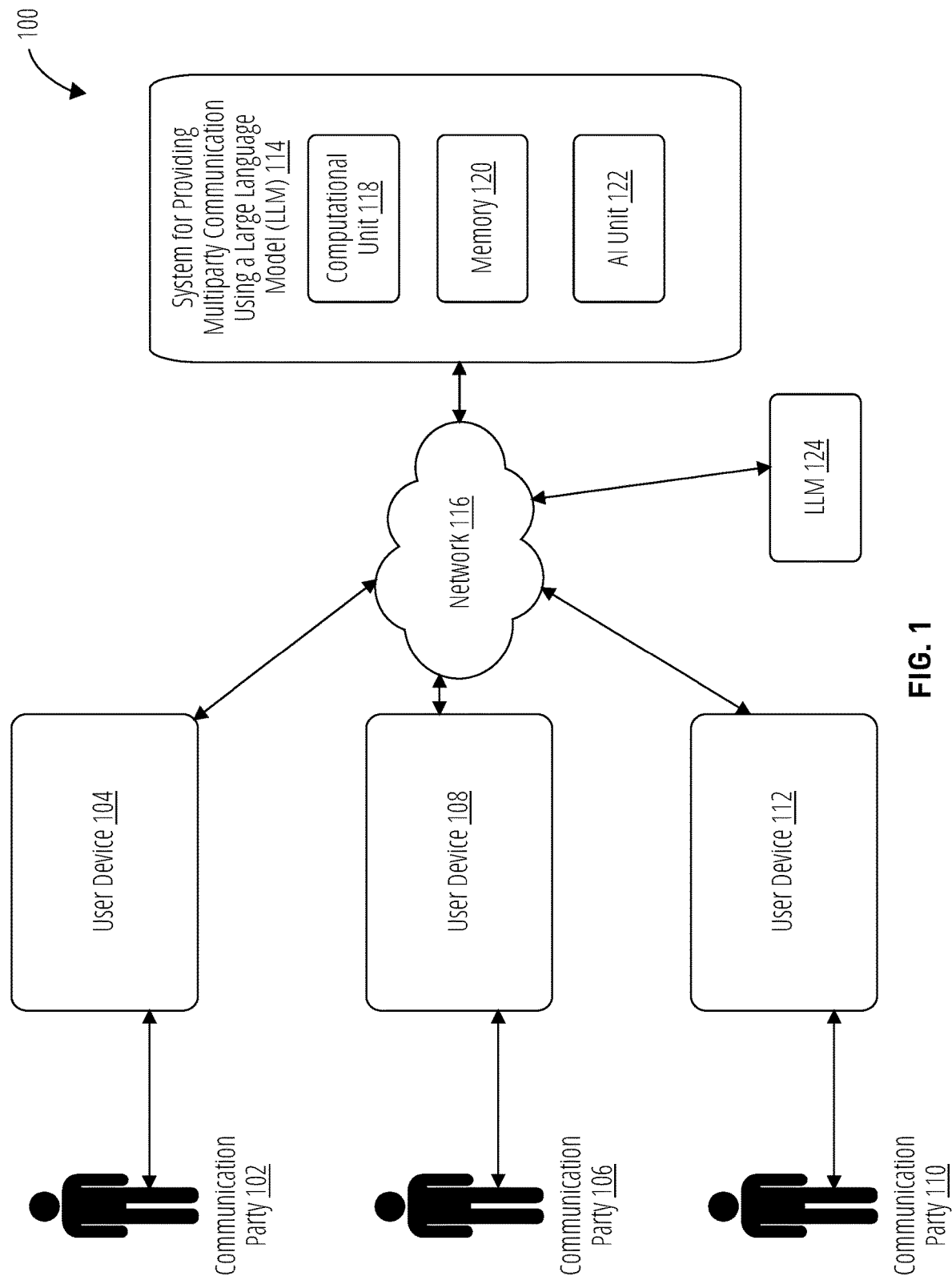
FIG. 1 illustrates an environment within which systems and methods for providing multiparty communication using an LLM can be implemented.

The following detailed description of embodiments includes references to the accompanying drawings, which form a part of the detailed description. Approaches described in this section are not prior art to the claims and are not admitted to be prior art by inclusion in this section. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and operational changes can be made without departing from the scope of what is claimed. The following detailed description is, therefore, not to be taken in a limiting sense, and the scope is defined by the appended claims and their equivalents.

Generally, embodiments of this disclosure relate to a system and a method for providing multiparty communications facilitated by generative Artificial Intelligence (AI) and an LLM. The LLM may be capable of processing text inputs and producing text outputs. An example LLM may include GPT-4®, a Transformer-based model pre-trained to predict the next token in a document (see "GPT-4 Technical Report," OpenAI (2023) (https://cdn.openai.com/papers/gpt-4.pdf—27 Mar. 2023)). LLMs have exhibited human-level performance on various professional and academic benchmarks. However, this system and method also anticipates future advances in language models that may modify or supersede the transformer architecture. It should in no capacity be interpreted to be limited to this architecture.

The LLM is a machine learning model that can recognize, predict, and generate human languages on the basis of very large text-based data sets. The system of the present disclosure may form a request for the LLM in the form of a text input prompt, receive a response output from the LLM to the request, and process the response output from the LLM to generate output messages to be sent to one or more communication parties.

Conventional systems for providing multiparty communications often use bots, such as chatbots, designed to communicate back to one person, similarly to how most people use ChatGPT®. When these systems are engaged in customer support, the customer sends a message which is intercepted initially by the bot that engages in a two-way conversation with the customer. When the bot cannot handle the conversation anymore or the customer requests to communicate with a human agent, the bot turns the conversation over to the human agent. The conversation then becomes a separate two-way conversation between the customer and the human agent with no bot interaction. At this stage, the bot may make suggestions to the human agent about what to say or to summarize the conversation, but the bot does not communicate with the customer anymore.

The customer experience can be improved and the human support agent can be more productive if the two separate two-way conversations were replaced with a multi-party conversation that included the customer, the human support agent and the bot. This is an important special case of multiparty communications.

In an example embodiment of the system disclosed herein, when the customer sends a message, a bot provided by the system joins the conversation together with a human agent. According to an example embodiment, the conversation is a multiparty conversation with two human participants (the customer and the human agent) and the bot orchestrating the conversation. The bot may handle all the initial responses with the customer, but the bot can also engage the human agent for more information or instruction as needed. The bot never exits the conversation. This approach has key advantages. Firstly, the bot does not have to 'think' on its own. Specifically, the bot knows that the agent can help answer questions so the bot does not hallucinate. Secondly, the bot helps the agent be more productive and the bot determines when and if the agent needs to engage. When the agent does engage, the agent can talk with the customer directly or the agent can talk through the bot. Thirdly, the bot may figure out how to handle the issue on its own, including making an update to an external system. Even in this embodiment, though, the bot calculates the certainty of the update and checks in with the agent before executing, if the update certainty does not exceed a threshold set by the organization.

There are numerous business and personal contexts where more than two people need to communicate over time while participants are located remotely with respect to each other. When a communication is synchronous or "live," such as in a telephone call or video conference, the participants are presumed to be fully engaged and attentive and can use cues derived from the conversation to know when they are being asked to respond. For a multiparty communication, where the participants are located remotely and the communication is asynchronous, it is less clear for each participant whether they need to pay attention to the conversation or when they are being asked to respond. A participant is also referred to herein as a communication party of multiparty communication.

When two communication parties are communicating, if a first communication party sends a message, a second communication party knows that the message is for the second communication party without having to read it. The second communication party may have to read the message to know if the message is urgent or requires a response, but there is no question about whether the message is intended for the second communication party. In a multiparty communication, if the first communication party sends a message, the other communication parties do not know if they need to pay attention or if they are supposed to respond unless they all read the message.

In an example three-way conversation relating to delivery to a customer's home involving a customer, a dispatcher, and a delivery driver, if the customer asks, "what's the ETA?" (where "ETA" refers to the estimated time of arrival), both the driver and the dispatcher need to review the customer's question to know who should answer. In this case, the driver is the logical participant to answer. Thus, there are two issues faced by the participants of the three-way conversation: which participant should pay attention to the message and who should provide an answer to the message.

The issues become combinatorial more complex as the number of simultaneous conversations increases and the number of participants in any of conversations increases, thus necessitating a general purpose solution.

The system of the present disclosure is based on the idea of a screenplay where several characters play different roles to advance a plot. If provided with the plot and the first few lines of a screenplay, the LLM can properly predict the next best line in the screenplay. The system of the present disclosure maps a multiparty conversation into the form of a screenplay where the LLM is one of the characters and the writer of its own lines. The communication parties in the multiparty conversation are the other characters with specific roles and backstories. The context of the conversation is the setting. The objective of the participants in the scenario is the driver of the plot. The LLMs role is as a facilitator, expeditor, or assistant to help the parties communicate to resolve the issue at the core of the story. As each communication party sends in a message, the system composes a prompt that includes all the lines of the screenplay, the characters, the plot and the setting, and asks the LLM to write the next lines for the character the LLM plays for the LLM to say to the other characters. The system takes those lines and sends them as messages to the other communication parties. Each of the participants in the multiparty conversation thus participate in a play that is written as they speak.

The system of the present disclosure facilitates communications between multiple communication parties with an LLM acting as an intermediary. The system can be configured to receive input messages from each communication party and algorithmically format the input messages to follow a specified syntax structure that can be used by the LLM. Upon formatting the input messages, the system may send the input messages to the LLM. The LLM may process the input messages and generate, based on the input messages, a response output of the LLM. The system may be further configured to analyze the content of the response output received from the LLM to draft, using the specified syntax structure, output messages to appropriate communication parties in response to the input messages. The system may algorithmically format and route the output messages generated based on the response output of the LLM to appropriate communication parties.

The system of the present disclosure may be associated with a specifically constructed prompt for an LLM to facilitate communications between multiple communication parties. The prompt may be constructed using natural language and is also referred to herein as a text input prompt. The prompt may include a setup defining an activity and a role of the LLM in the conversation, a definition of the number of communication parties, and a definition of the personas of the communication parties, potentially explicitly defining to what information each communication party has access. The prompt may further include a specified action to take in the event of missing information in order to keep communication parties informed and/or mitigate hallucination. The prompt may further include a defined syntax structure of input messages and response outputs for interfacing with a computational unit and may include potential examples of previous conversations. The computational unit may also switch between different prompts for the LLM whenever specific conditions are satisfied in the conversation.

Referring now to the drawings, various embodiments are described in which like reference numerals represent like parts and assemblies throughout the several views. It should be noted that the reference to various embodiments does not limit the scope of the claims attached hereto. Additionally, any examples outlined in this specification are not intended to be limiting and merely set forth some of the many possible embodiments for the appended claims.

Referring now to the drawings, FIG. 1 illustrates an environment 100 within which systems and methods for providing multiparty communication using an LLM can be implemented. As used herein, the term "multiparty communication" refers to communications between two or more communication parties. The environment 100 may include a communication party 102 associated with a user device 104, a communication party 106 associated with a user device 108, a communication party 110 associated with user device 112, a system 114 for providing multiparty communication using an LLM (also referred to herein as a system 114), and a data network shown as a network 116. The system 114 may communicate with the user device 104, the user device 108, and the user device 112 (also referred to herein as communication endpoints) via the network 116.

Each of the user device 104, the user device 108, and the user device 112 may include, but is not limited to, a smartphone, a laptop, a personal computer, a desktop computer, a tablet computer, a phablet, a personal digital assistant, a mobile telephone, a smart television set, a personal computing device, and the like.

The system 114 may include a computational unit 118, a memory 120 storing instructions to be executed by the computational unit 118, and an AI unit 122. The system 114 may further include or be in communication with an LLM 124. The LLM 124 may include a machine learning model configured to recognize, predict, and generate human languages on the basis of very large text-based data sets. The system 114 may communicate with the LLM 124 via the network 116.

In an example embodiment, the AI unit 122 may use the generative AI. The generative AI may be configured to perform generation of text, images, videos, or other data using generative models, usually in response to prompts. The LLM 124 is an example of a generative model. The LLM 124 may be a generative AI model configured to learn the patterns and structure of input training data and generate new data that have similar characteristics. The LLM may also be configured to use Retrieval Augmented Generation (RAG) or similar techniques to provide higher quality responses by utilizing data sources, including vector databases, which may contain proprietary data.

In an example embodiment, the operations of the computational unit 118 and the AI unit 122 may be performed by one or more processors in communication with the memory 120. In some example embodiments, the operations of the LLM 124 may be performed by the one or more processors.

The network 116 can refer to any wired, wireless, or optical networks including, for example, the Internet, intranet, a Local Area Network (LAN), a Personal Area Network, Wide Area Network (WAN), a Virtual Private Network, a Wi-Fi® network, cellular phone networks (e.g., a Global System for Mobile (GSM) communications network, a packet switching communications network, a circuit switching communications network), Bluetooth™ radio, an Ethernet network, an IEEE 802.11-based radio frequency network, a Frame Relay network, an Internet Protocol (IP) communications network, or any other data communication network utilizing physical layers, link layer capability, or network layers to carry data packets, or any combinations of the above-listed data networks. In some embodiments, the network 116 may include a corporate network, a data center network, a service provider network, a mobile operator network, or any combinations thereof.

Figure 2:
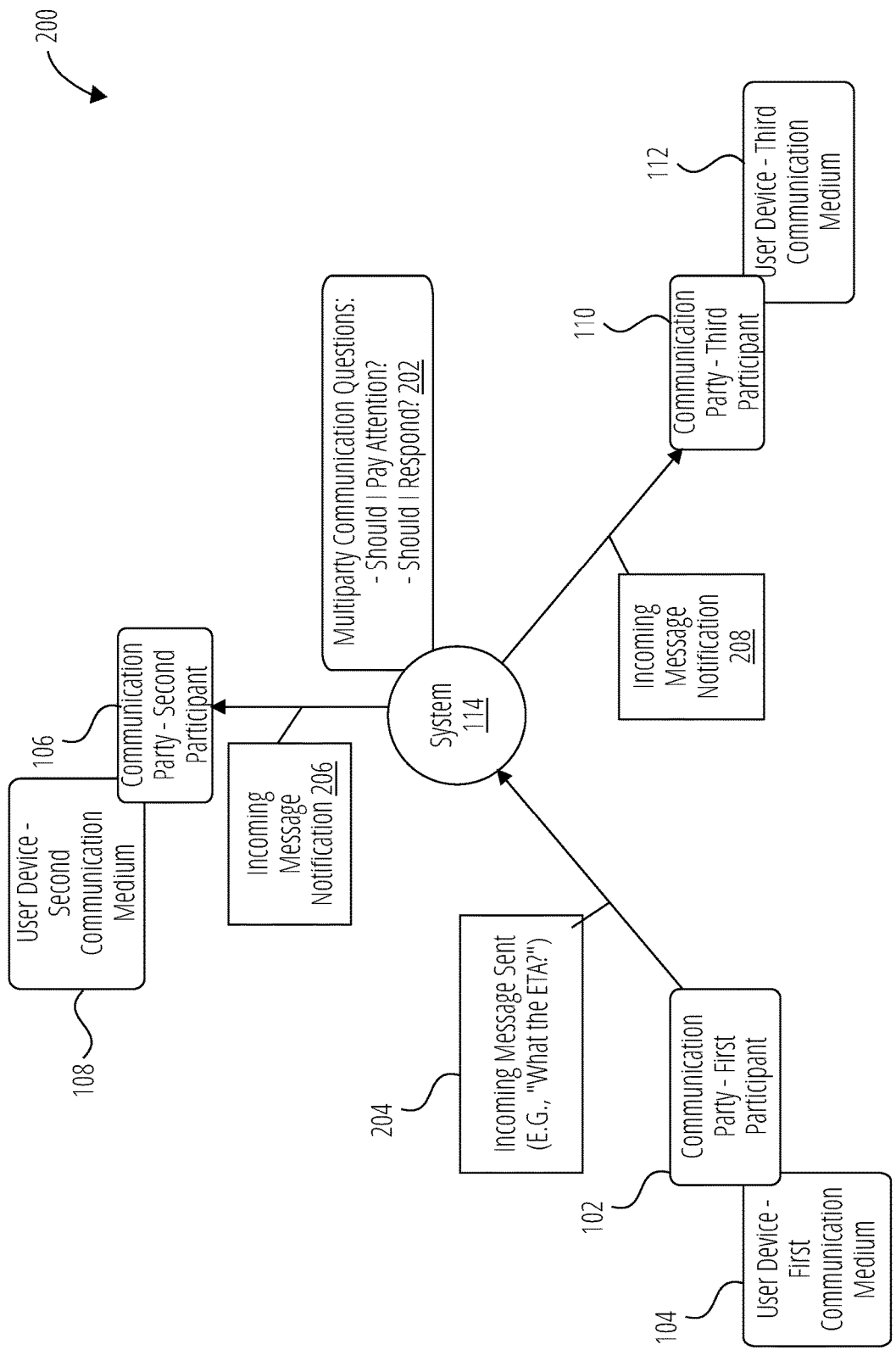
FIG. 2 is a schematic diagram illustrating interactions provided between communication parties by the system for providing multiparty communication using an LLM, according to an example embodiment.

FIG. 2 is a schematic diagram 200 illustrating interactions provided between communication parties by the system 114 for providing multiparty communication using an LLM, according to an example embodiment. In FIG. 2, a first participant (shown as a communication party 102), a second participant (shown as a communication party 106), and a third participant (shown as a communication party 110) are engaged in a multiparty communication using a first communication medium (shown as a user device 104), a second communication medium (shown as a user device 108), and a third communication medium (shown as a user device 112), respectively. The communication party 102 sends an incoming message 204 (e.g., "what's the ETA"). For typical asynchronous communication, the communication party 106 and the communication party 110 both receive an incoming message notification 206 and an incoming message notification 208, respectively. When the communication party 106 and the communication party 110 receive the incoming message notification 206 and the incoming message notification 208, respectively, both of the communication party 106 and the communication party 110 need to decide whether the communication party 106 and the communication party 110 should pay attention to the incoming message notification 206 and the incoming message notification 208, respectively, and open the incoming message 204 to review it, and, further, decide whether the communication party 106 and the communication party 110 should respond. These issues addressed by the system 114 are shown as multiparty communication questions 202.

For arbitrary messages with no context, it may be unclear whether any given participant of the multiparty communication should pay attention and should respond. However, many multiparty communications are conducted in the context of a particular scenario where each of the participants is playing a role and in that role, the participants are expected to take action and have information about the scenario of the multiparty communication as it unfolds over time.

Figure 3:
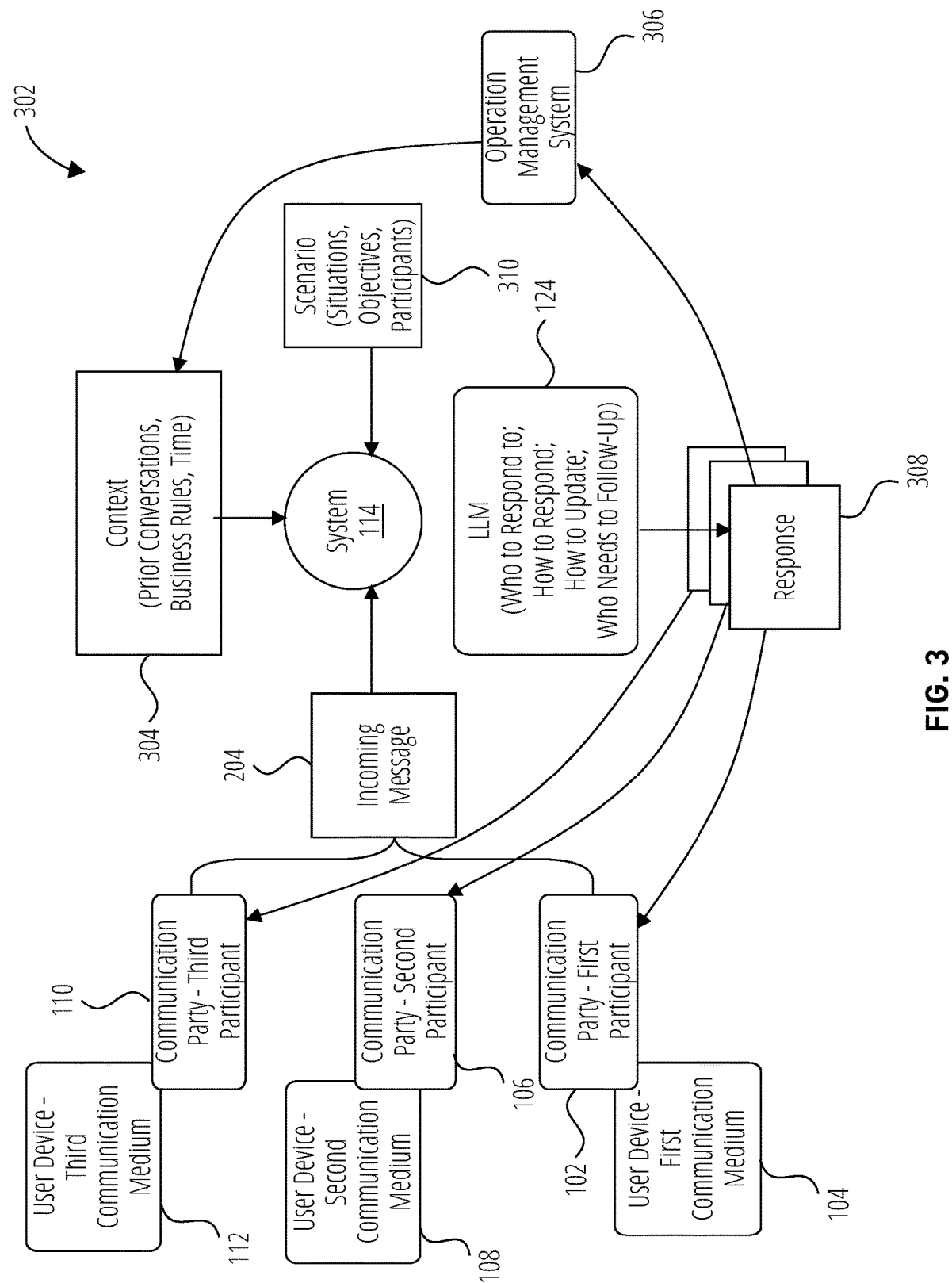
FIG. 3 is a schematic diagram illustrating interactions provided between communication parties by a system for providing multiparty communication using an LLM, according to an example embodiment.

FIG. 3 is a schematic diagram 302 illustrating interactions provided between communication parties by the system 114 for providing multiparty communication using an LLM, according to an example embodiment. The system 114 may receive a request in a form of an incoming message 204 from a communication party, such as one of a communication party 102 (e.g., a customer), a communication party 106 (e.g., a dispatcher of a service provider, such as a tow dispatch provider, and the like), and a communication party 110 (e.g., a driver that provides the service on behalf of the service provider). In an example embodiment, the system 114 may act as a bot that provides and facilitates interactions between the communication parties. In an example embodiment, the system 114 may provide a multiparty communication between two or more communication parties, which may include human communication parties and a bot provided by the system 114. Even though FIG. 3 shows three human communication parties (the customer, the dispatcher, and the driver), the system 114 may be configured to provide the multiparty communication between two or more human communication parties.

Upon receiving the incoming message 204, the system 114 may access data related to a scenario 310. The data related to the scenario 310 may include data related to situations associated with the multiparty communication (e.g., a type of service to be provided), objectives of the multiparty communication, participants of the multiparty communication, and so forth.

In an example embodiment, the system 114 may be in communication with an operations management system associated with the service provider. The communication party 106 may be the dispatcher of the service provider. Examples of operation management systems 306 include Transportation Management Systems (TMS) used to manage delivery (e.g. —third-party systems from Onfleet®, Oracle®, Project44® or Blue Yonder® and company owned systems such as those operated by Ryder® or DoorDash®) and Customer Relationship Management (CRM) systems used to manage field service (e.g. —third-party systems from Salesforce® and Microsoft®).

The system 114 may be further configured to receive a context 304 associated with the multiparty communication. In an example embodiment, the context 304 may be received from the operation management system 306. The context 304 may include prior messages associated with prior conversations between any of the communication parties, business rules of the service provider or the communication party that provides the service on behalf of the service provider, order details, time the service is requested to be provided, and so forth.

The system 114 may combine data associated with the incoming message 204 and the scenario 310 with the context 304 and provide the combined data to the LLM 124 in communication with the system 114. The system 114 further provides one or more multiparty communication questions to the LLM 124. The one or more multiparty communication questions may include the following questions: who to respond to, how to respond, how to update, and who needs to follow-up. The LLM 124 may be configured to provide answers to the one or more multiparty communication questions based on the data provided by the system 114 to the LLM 124.

The LLM 124 may receive and process the incoming message 204, the scenario 310, the context 304, and the one or more multiparty communication questions and provide a response output to the system 114. The response output may include one or more responses 308 to be sent to communication parties and multiparty communication instructions. The multiparty communication instructions may include answers to the one or more multiparty communication questions. The system 114 may parse the information contained in the response output to determine the one or more responses 308 and the answers to the one or more multiparty communication questions. The answers to the one or more multiparty communication questions may include answers to questions including which communication party to respond to, how to respond, how to update the data associated with the multiparty communication, and who needs to follow-up in the multiparty communication.

Based on the information contained in the multiparty communication instructions, the system 114 may send the one or more responses 308 as needed to the communication party 102, the communication party 106, and the communication party 110. Moreover, based on the multiparty communication instructions, the system 114 may update information associated with the multiparty communication in the operation management system 306. In the response 308, the system 114 may tag the relevant communication party (i.e., add a tag associated with the relevant communication party to the response 308) only if this communication party needs to pay attention to the response 308.

Upon receiving the response 308, any of the communication party 102, the communication party 106, or the communication party 110 may reengage in the multiparty communication by sending a further incoming message. Receiving the further incoming message by the system 114 triggers repeating of the process illustrated in FIG. 3.

Figure 4:
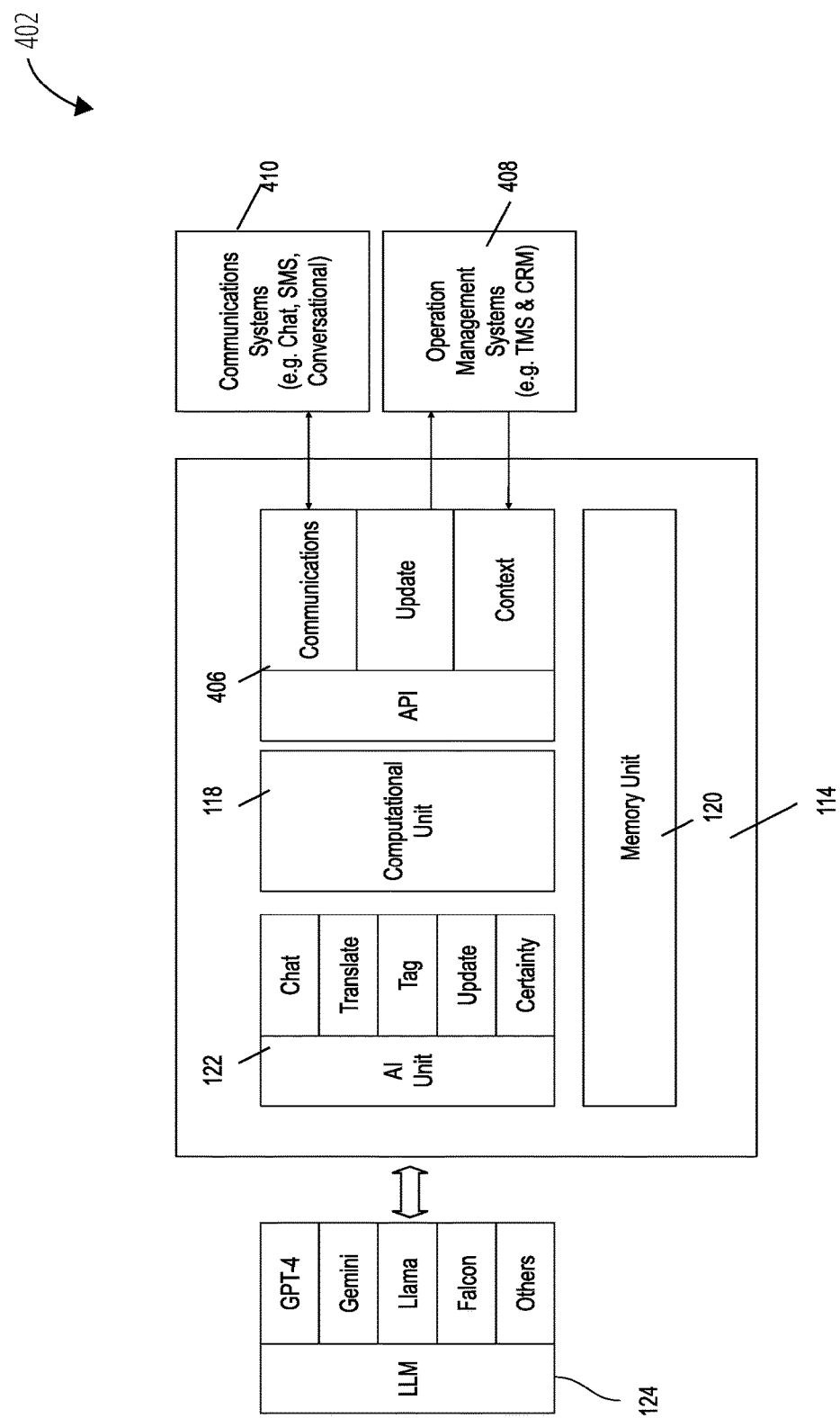
FIG. 4 is a schematic diagram illustrating an architecture of a system for providing multiparty communication using an LLM, according to an example embodiment.

FIG. 4 is a schematic diagram illustrating an architecture 402 of the system 114 for providing multiparty communication using an LLM, according to an example embodiment. The architecture 402 of the system 114 may be hosted in a cloud, e.g., Google Cloud® or Amazon Web Services (AWS)®.

The system 114 may include the AI unit 122, a Computational Unit 118, a memory 120, and an Application Programming Interface (API) 406. The system 114 may be in communication with and embedded into third-party operations management systems 408. The system 114 may be in communication with and embedded into Communication Systems 410. The system 114 may further include or be in communication with an LLM 124. The LLM 124 may be hosted by a cloud computing platform, such as Microsoft® and Azure®. The LLMs 124 used by the system 114 may include GPT-4®, Gemini®, Llama®, Falcon®, and other language models.

The system 114 may use the LLM 124 to facilitate at least five key AI functionalities of the AI unit 122. First, the AI unit 122 may be configured to use the LLM 124 to manage and orchestrate a chat in the conversation between multiple communication parties. Second, the AI unit 122 may be configured to translate between multiple languages the incoming messages received by the system 114 from the communication parties and output messages sent by the system 114 to the communication parties. Third, the AI unit 122 may be configured to read the whole conversation, determine which communication party needs to pay attention to which message, and tag the appropriate communication party when the message is sent to that communication party to alert the communication party to pay attention to the message. Fourth, the AI unit 122 may be configured to formulate and update data in an operation management system in communication with the system 114 by sending update requests based on interactions that occurred in the multiparty communication. Fifth, the AI unit 122 may be configured to provide a certainty factor. The certainty factor may be calculated by the AI unit 122 by comparing what the update request is to what the actual conversation is. Then, the AI unit 122 determines whether the certainty factor passes a predetermined certainty threshold to determine whether the update to the operation management system is needed to be made automatically (if the predetermined certainty threshold is not passed) or whether an attention of the communication party (e.g., a dispatcher) to the conversation is needed before the update is made (if the predetermined certainty threshold is passed).

The API 406 of the system 114 may use a communications API to connect to multiparty Communication Systems 410 to send and receive messages from the plurality of communication parties. Examples of Communication Systems include third-party services like TalkDesk®, Simple Messaging Service (SMS), WhatsApp®, Slack®, and Riptide® and embedded Communication Systems such as those embedded in TMS and CRM systems.

The API 406 may be further configured to provide updates. In an example embodiment, to provide updates, the API 406 may trigger workflows within the operations management system 408 to make proper updates to occur.

The API 406 may be further configured to gather context. In an example embodiment, to gather context the API 406 may query the operations management system 408 to provide order information, business rules, or data about the communication parties.

Figure 5:
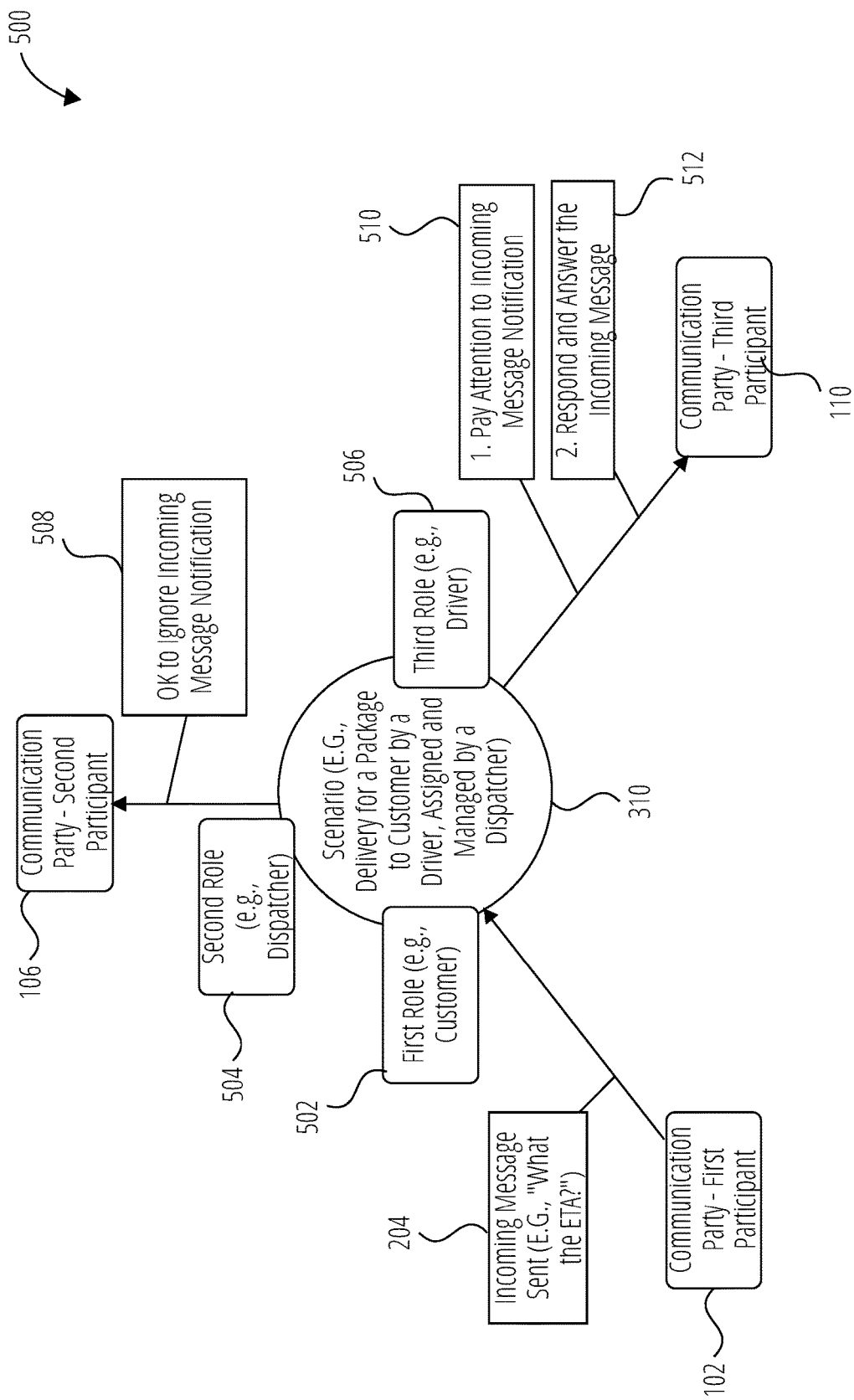
FIG. 5 is a schematic diagram illustrating engaging of a first participant, a second participant, and a third participant in a multiparty conversation in the context of a scenario, according to an example embodiment.

FIG. 5 is a schematic diagram 500 illustrating engaging a first participant (shown as a communication party 102), a second participant (shown as a communication party 106), and a third participant (shown as a communication party 110) in a multiparty conversation in the context of a scenario 310, according to an example embodiment. An example scenario 310 is delivery of a package to a customer by a driver, which is assigned and managed by a dispatcher. The first participant (the communication party 102) plays a first role 502 (e.g., the customer). The second participant (the communication party 106) plays a second role 504 (e.g., the dispatcher). The third participant (the communication party 110) plays a third role 506 (e.g., the driver). Given this scenario 310, the roles, and the content of the incoming message 204 from the first participant (the communication party 102) playing the first role 502, the system 114 may act as an intelligent conversational agent in the multiparty conversation. The system 114 may be configured to deduce that the second participant (the communication party 106) playing the second role 504 can ignore the incoming message notification (i.e., the incoming message notification 206 shown in FIG. 2), as shown in block 508. Further, the system 114 may be configured to deduce that the third participant (the communication party 110) playing the third role 506 should pay attention to the incoming message notification (i.e., the incoming message notification 208 shown in FIG. 2), as shown in block 510, and should respond and answer the query in the incoming message 204, as shown in block 512.

Thus, with the understanding of the scenario 310, roles, and conversational input (i.e., the incoming message 204), the system 114 may act as the intelligent conversational agent and may facilitate a multiparty conversation by converting it into several two-way conversations between each participant and the intelligent conversational agent. Alternatively, the system 114 acting as the intelligent conversational agent may facilitate the multiparty conversation by acting as an active participant in the multiparty conversation, engaging when other participants are slow or unable to respond, or prompting other participants to engage in the multiparty conversation. In some example embodiments, the system 114 acting as the intelligent conversational agent may facilitate the multiparty conversation by acting as an active participant in the multiparty conversation while separately engaging in two-party or multiparty conversations about the multiparty conversation with selected participants. Many other example embodiments may exist for the system 114 acting as the intelligent conversational agent to facilitate the multiparty conversation.

Figure 6:
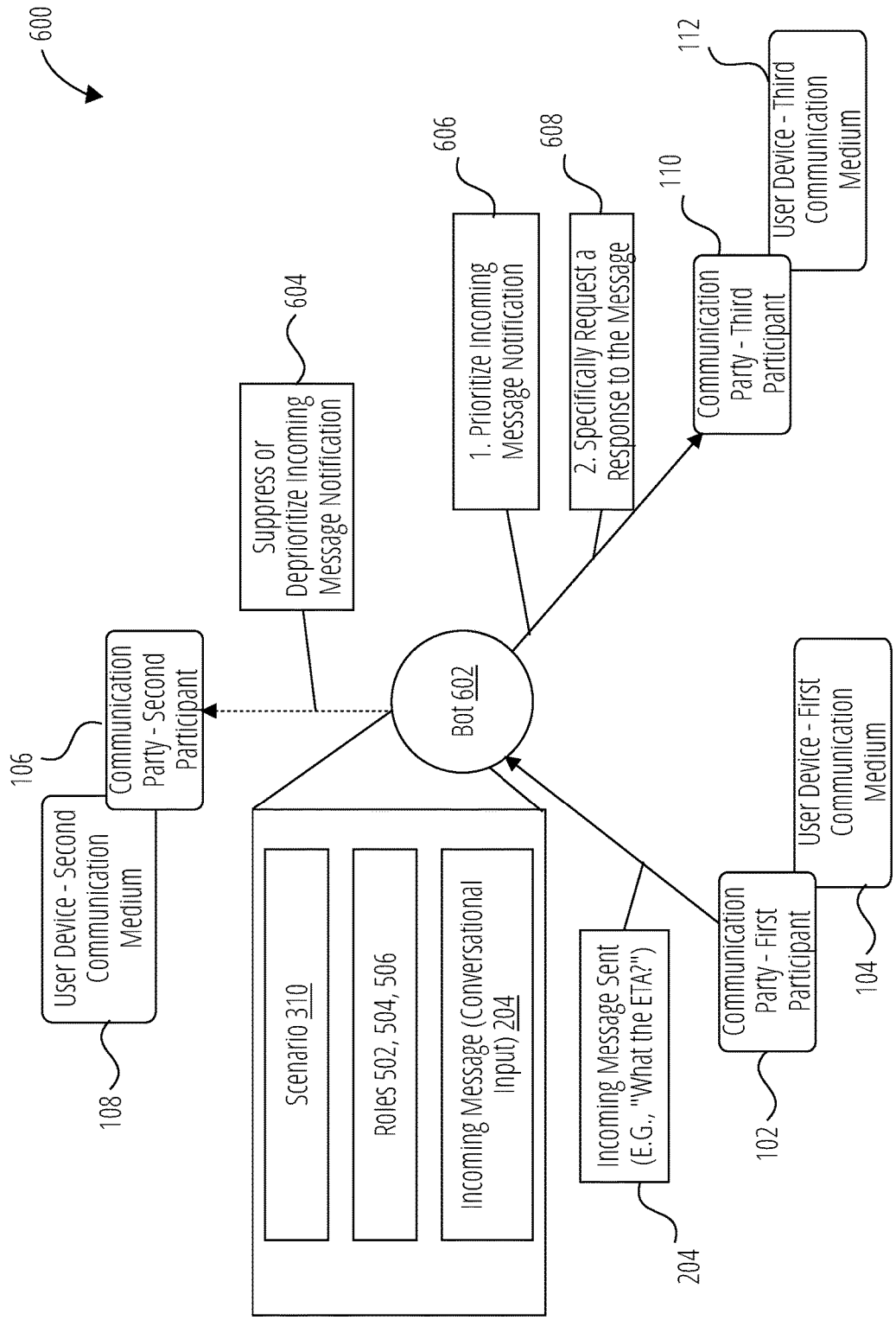
FIG. 6 is a schematic diagram illustrating a system for providing multiparty communication using an LLM acting as a bot, according to an example embodiment.

FIG. 6 is a schematic diagram 600 illustrating a system 114 acting as a bot 602, according to an example embodiment. As used herein, the bot 602 may include an autonomous program that operates in a network and can interact with systems and/or users in the network.

The bot 602 may be configured to understand a scenario 310, roles 502, 504, 506, and an incoming message 204 (a conversational input). The bot 602 may conduct two-way conversations with each of a first participant (shown as a communication party 102), a second participant (shown as a communication party 106), and a third participant (shown as a communication party 110) by acting as an intermediary.

Given the scenario 310, the roles, and the content of the incoming message 204 from the first participant (the communication party 102) playing the first role 502, the system 114 may be configured to deduce that the incoming message notification (i.e., the incoming message notification 206 shown in FIG. 2) to the second participant (the communication party 106) playing the second role 504 can be suppressed or deprioritized as shown in block 604. Further, the system 114 may be configured to deduce that the incoming message notification (i.e., the incoming message notification 208 shown in FIG. 2) to the third participant (the communication party 110) playing the third role 506 should be prioritized as shown in block 606, and the system 114 may be configured to deduce to specifically request a response to the message, as shown in block 608, from the third participant (the communication party 110) playing the third role 506.

In a second example embodiment, the bot 602, when imbued with the understanding of the scenario 310, the roles 502, 504, 506, and the incoming message 204 (the conversational input), may facilitate the multiparty conversation by acting as an active participant in the multiparty conversation, engaging when other participants are slow or unable to respond, or prompting other participants to engage in the multiparty conversation.

In a third example embodiment, the bot 602, when imbued with the understanding of the scenario 310, the roles 502, 504, 506, and the incoming message 204 (the conversational input), may simultaneously engage in the multiparty conversation by acting as an active participant in the multiparty conversation while separately engaging in two-party or multiparty conversations about the multiparty conversation with selected participants thus orchestrating a plurality of dialogues of one or more subsets of the plurality of communication parties as part of the same conversation associated with the multiparty communication.

The present disclosure addresses the aforementioned needs by providing an architecture for multiparty communication and issue resolution using an LLM as an intermediary between the communication parties. The system of the present disclosure is configured to manage communication, share information between communication parties as needed, and facilitate issue resolution more efficiently. Additionally, the system provides an authorized party with the ability to selectively enable direct communication between two or more communication parties at their discretion.

The system of the present disclosure may include the bot 602 that acts as an intelligent conversational agent configured to participate in a multiparty conversation by acting as an intermediary between participants who communicate asynchronously and play roles in the context of human scenarios. The bot 602 may be in communication with the LLM configured to understand the scenario 310, the roles 502, 504, 506, and the incoming message 204 either based on pre-training of the LLM, fine-tuning of the LLM with additional training data, or by incorporating additional data into the prompt using RAG or similar methods.

Figure 7:
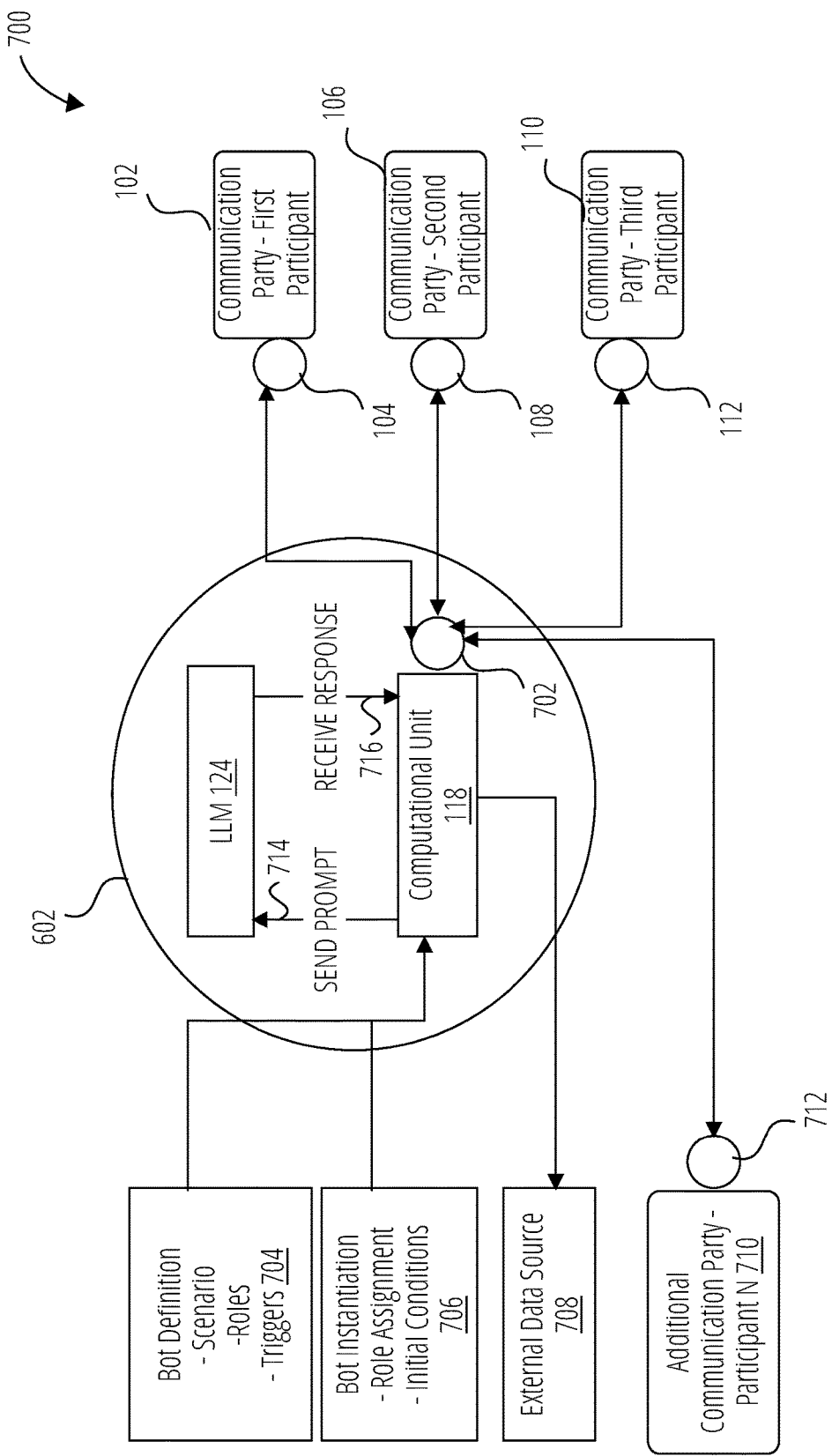
FIG. 7 is a schematic diagram that shows components of a system for providing multiparty communication using an LLM, according to an example embodiment.

FIG. 7 is a schematic diagram 700 that shows components of the system of the present disclosure acting as a bot 602, according to an example embodiment. In an example embodiment shown in FIG. 7, the system of the present disclosure may include two main components. The first component is an LLM 124 that may be configured to receive a specially constructed prompt and generate a response output of the LLM with a predetermined syntax structure indicating to whom messages in the response output are to be routed. The second component is a computational unit 118 that may use predetermined rules to process the response output of the LLM 124, as well as format input messages being provided to the LLM 124, both based on a predetermined syntax structure.

The bot 602 may be configured to communicate with participants of multiparty communication, such as a communication party 102, a communication party 106, and a communication party 110, by sending messages between a communication endpoint 702 associated with the bot 602 and the user device 104, user device 108, and user device 112 associated with the communication party 102, the communication party 106, and the communication party 110, respectively. The bot 602 may be configured to communicate with additional communication parties 710, shown as a participants N, using a user devices 712 associated with the additional communication parties 710.

The computational unit 118 may receive the input in the form of input messages from various external data sources 708 and compute and compose the input in form of a prompt, i.e., a text input prompt, for the LLM 124.

The LLM 124 may include a LLM such as OpenAIR's GPT-4® or other LLM sufficiently capable to understand the text input prompt and respond properly. The LLM 124 may be configured to receive an input in form of the text input prompt, as shown in step 714, and compute an output in form of a response output. The text input prompt may include a natural language prompt, text in a data interchange format such as JSON (JavaScript Object Notation), XML (extensible Markup Language) or other data interchange format, or a combination of both. The response output may include a natural language response, text in a data interchange format such as JSON, XML or other data interchange format, or a combination of both.

In a further embodiment, the input prompt may be in a combination of modalities, such as text, an image, audio, video, a location, and any other data type or data format. A modality may refer to a category of data defined by how the data are received, represented, and understood. In a further embodiment the response output may be in a combination of modalities, such as text, an image, audio, video, a location, and any other data type or data format.

The LLM 124 may compute the response output based on the text input prompt. The LLM 124 may compute the response output based on pre-training of the LLM 124 on a plurality of scenarios, based on fine-tuning of the LLM with additional training data, or by incorporating additional data into the prompt using RAG or similar methods. The response output of the LLM 124 may be structured and formatted based on predetermined rules, including a syntax structure provided in the text input prompt. The response output may include a set of messages including a message content and instructions as to which participant (communication party) each message is to be sent.

The computational unit 118 may receive the response output from the LLM 124, as shown in step 716, and interpret the instructions present in the response output to take an action to distribute the messages to the participants.

In an example embodiment, the input received by the computational unit 118 may further include a bot definition 704. The bot definition 704 may include the scenario selected from a plurality of scenarios that the LLM 124 is configured to understand either based on pre-training of the LLM 124, based on fine-tuning of the LLM 124 with additional training data or by incorporating additional data into the prompt using RAG or similar methods. The bot definition 704 may further include roles of potential participants (communication parties) in the scenario and triggers that include conditions, such as a response received from one or more of the participants that may cause the bot 602 to engage.

The input received by the computational unit 118 may further include a bot instantiation 706 for the particular conversation that the bot 602 may facilitate. The bot instantiation 706 may include an identity of initial participants, communication endpoints associated with the participants (noting that one or more participants may share a communication endpoint as long as messages sent or received may be associated with the identity of the participants), the assignment of the initial participants to roles in the scenario, and the initial conditions for the scenario that may be received from a participant or the external data source or inferred from the conversation and may define information already known about the scenario.

The computational unit 118 may be configured to send and receive an input from one or more of the following: initial participants of conversations using communication endpoints assigned to the initial participants, additional participants that may be added to the conversations as identified by the bot 602 or may join the conversations on their own, and external data sources 708 that may be queried by the bot 602 or may post information related to the scenario to the bot 602.

In an example embodiment, participants of the multiparty communication may include further bots that may be responsible for other scenarios and sets of participants. Bots may be sending information to each other about internal conversations that both are refereeing. For example, one bot may be managing a conversation in a finance department, while the other bot may be managing a conversation in an engineering department. If the bot of the finance department notices some piece of information that may be useful to the engineering department, the bot of the finance department may engage in conversation with the bot of the engineering department to share the information with relevant participants.

Figure 8:
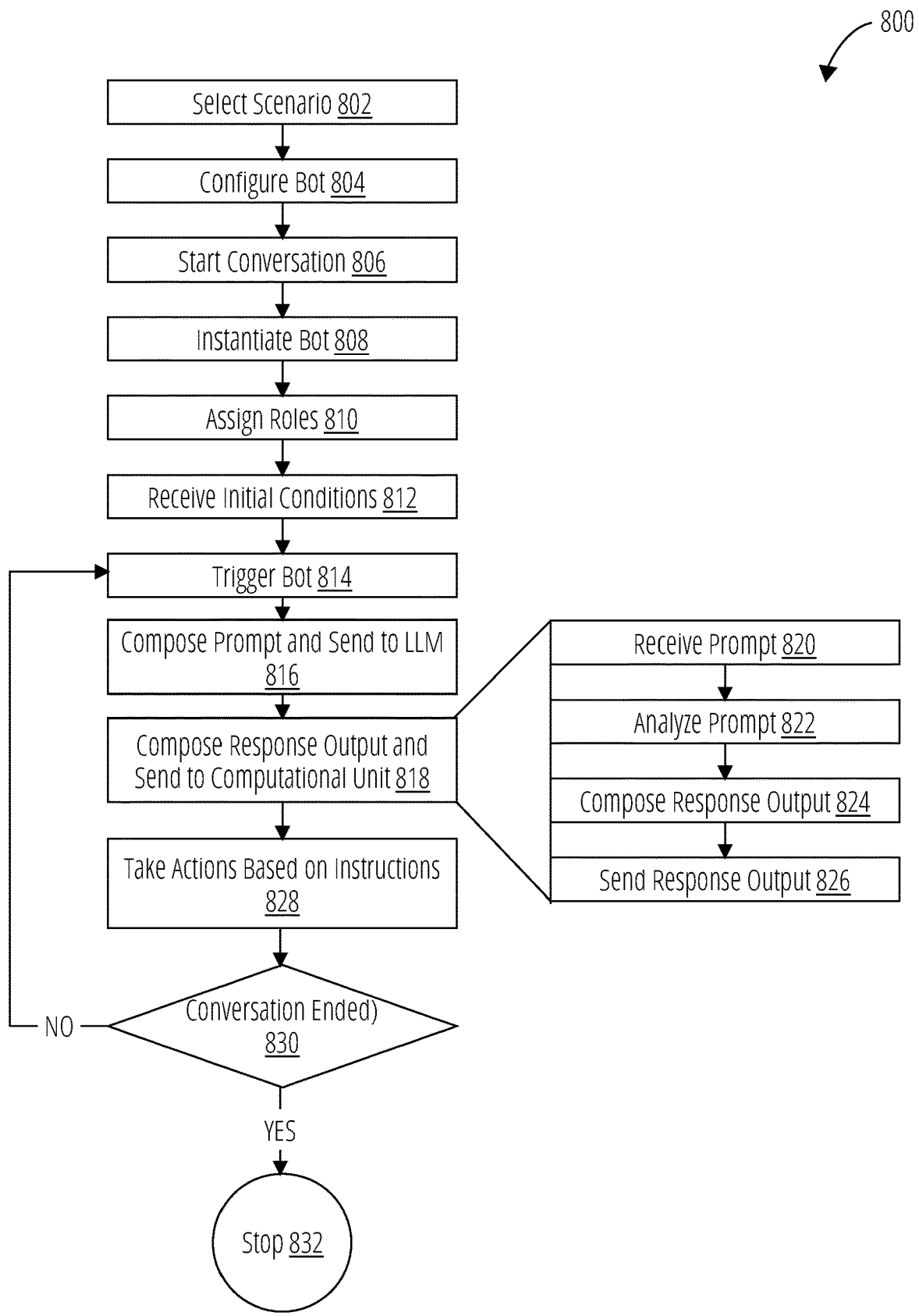
FIG. 8 is a block diagram illustrating a sequence of steps for engaging a system for providing multiparty communication using an LLM that acts as a bot in multiparty communication, according to an example embodiment.

FIG. 8 is a block diagram 800 illustrating an example sequence of steps for engaging the system acting as the bot 602 shown in FIG. 6 and FIG. 7 in multiparty communication, according to an example embodiment. In an example embodiment, the bot 602 may include the system for providing multiparty communication using an LLM of the present disclosure. The sequence of steps shown in FIG. 8 is not meant to be limiting as other sequences of engaging the bot 602 can be used to similar effect. For example, a scenario may be predefined or selected by a participant or an external data source or the scenario may be inferred based on an identity of participants and/or an initial conversation. The bot 602 may join the multiparty communication from the start of the multiparty communication or may be invited to join or triggered to join later.

In a select scenario step shown in block 802, a scenario may be pre-configured. Alternatively, the scenario may be selected later by the participant of the multiparty communication or the external data source or inferred based on the identity of the participants and/or the initial conversation.

In a configure bot step shown in block 804, a bot may be configured with a bot definition. The bot definition may include the scenario, roles, and triggers.

In a start conversation step shown in block 806, the participant or the external data source may start a conversation with one or more other initial participants in the context of the scenario.

In an instantiate bot step shown in block 808, the bot may join the conversation or may be invited by the participant or the external data source. The bot may act as an intermediary for one, some, or all of the participants of the multiparty communication.

In an assign roles step shown in block 810, the bot may assign roles to the participants based on the identity of the participants or related metadata. In an example embodiment, the participants may choose their role or the external data source may assign roles to the participants.

In a receive initial conditions step shown in block 812, the bot may receive initial conditions that define information already known about the scenario.

In a trigger bot step shown in block 814, the bot may be triggered, i.e., engaged to participate in the multiparty communication based on the triggers. The bot may be engaged to start the conversation with a participant. Then, the bot may wait until the participant responds. Alternatively, the bot may listen to messages and look for a particular content in the messages as a trigger. Alternatively, the bot may wait until too much time has elapsed and a communication party still has not responded. The bot may determine the amount of wait time based on the scenario, or the amount of wait time may be predetermined.

In a compose prompt and send to LLM step shown in block 816, the computational unit associated with the bot may compose a prompt using the scenario, roles, assignments of participants to roles, initial conditions, and any dialogue that has occurred among the participants including the bot or an input from the external data source. The computational unit may send the prompt in the form of a text input prompt to the LLM.

In a compose response and send to computational unit step shown in block 818, the LLM may receive the text input prompt and return a response output with instructions for the computational unit. The LLM uses its knowledge related to the scenario and the world in general garnered in pre-training and/or fine-tuning to process the text input prompt and compute a series of tokens as instructed by the text input prompt. The series of tokens may represent the response output returned by the LLM to the computational unit. Specifically, the LLM may receive the prompt, as shown in block 820, and analyze the prompt, as shown in block 822. Based on the analysis of the prompt, the LLM may compose the response output, as shown in block 824, and send the response output to the computational unit, as shown in block

826. The prompt and the flow of operations performed by the LLM are key elements of the system of the present disclosure.

In a take action based on instructions step shown in block 828, the computational unit may follow instructions provided in the response output received from the LLM. Based on the instructions, the computational unit may generate and send output messages to the appropriate participants or take other actions as instructed by the LLM.

This process repeats by continuing to review additions to the conversation against the trigger conditions until the conversation is ended by one of the participants, the external data source, or the bot based on its understanding of the scenario and the dialogue, as shown in decision block 830. If the conversation ends in decision block 830, the process stops in block 832. If the conversation does not end in decision block 830, the process returns to block 814.

FIG. 9 is a schematic diagram 900 illustrating key components of a prompt 902 composed for and provided to the LLM, according to an example embodiment. An "activity" component 904 of the prompt 902 may include a setup defining the activity in which the LLM may be participating. The activity may include a conversation, a workflow, a project, or any human activity that provides, to the LLM, further context on what to expect and how to respond.

A "number of parties" component 906 may define the number of communication parties in a multiparty communication. The number of communication parties may be a fixed number or may indicate that communication parties are expected to join or leave arbitrarily or at different points or milestones of the activity. The number of communication parties may be implied by the "scenario and roles".

A "scenario and roles" component 908 may include defining the roles or personas of the participants including categories of knowledge relevant to the scenario about which the participant may be expected to have the information. For example, in a roadside service scenario, the driver is one of the roles. The prompt 902 may include a statement that the driver is expected to know his ETA. These additional categories of knowledge that a participant may know about may be made explicit in the prompt 902 or may be implied by the scenario. For example, the GPT-4® LLM is likely, based on pre-training, to infer that the driver in the roadside service scenario may know his ETA.

A "role of the bot in the scenario (bot role)" component 910 may include defining the role of the bot in the conversation occurring in the multiparty communication. For example, the bot may be expected to only conduct two-way conversations between the participants. In some example embodiments, the bot may be expected to be a facilitator that engages in a multiparty conversation to help keep the conversation flowing. In an example embodiment, the bot may be expected to both facilitate the multiparty conversation and conduct separate two-way or multiparty conversations with other participants. Additionally, the bot may be expected to engage other participants, other bots, or other external data sources in the multiparty conversation as needed.

A "limits to prevent hallucination (hallucination limits)" component 912 may include defining limits to prevent hallucination. "Hallucination" refers to providing, by the LLM one or more tokens that are inaccurate or unreliable when predicting the series of tokens based on the prompt 902 to provide as a response output (see OpenAI (2023)). The response output of the LLM may otherwise appear convincingly correct, but the answer is an artifice of choosing a likely next word and not based on any "real-world" information. To account for the potential of the LLM to hallucinate, the hallucination limits include explicit directions to provide an alternative response when information is not available. For example, without any limits to prevent hallucination, in a roadside service scenario, if the ETA has not yet been shared in the conversation, then, when asked by the customer "what is the ETA?," the LLM may respond "45 minutes" because 45 minutes may be a typical time of arrival based on pre-training or other training input. However, by instructing the LLM, in the prompt 902, "if asked for information that is currently not available in the conversation . . . take a specific action," the LLM is guided to not guess but rather take that action.

An "action to take in event of limit (hallucination action)" component 914 may include defining a specific action to take in the event of missing information in order to keep communication parties informed and mitigate hallucination. Continuing the example roadside service scenario above, the prompt 902 may include the following text: "If asked for information that is currently not available in the conversation, draft a message to whichever communication party you think may have this information. If you do not think any party has this information, be honest and admit that you do not have the answer." In this case, the hallucination action is to ask one of the other participants in the conversation for the answer to the question. The hallucination action, in combination with the categories of knowledge identified explicitly or implied by the scenario and roles, causes the LLM to create messages directed to the participants with the particular role to provide information that may otherwise be unreliably generated (hallucinated).

A "syntax structure of incoming messages from a computational unit (incoming syntax structure)" component 916 may include defining the syntax structure of the incoming messages. The instructions in the prompt 902 may allow the LLM to precisely interpret the prior messages in the conversation, including the role of the participant who spoke the message in the conversation. For example, the instructions about the syntax structure of incoming messages may include "Messages from the customer begin with 'customer:' messages from the driver begin with 'driver:' and messages from the employee begin with 'employee:'

In another embodiment, a "syntax structure of incoming messages from a computational unit (incoming syntax structure" component 916 may be defined more precisely using JSON, XML, or other data interchange format.

A "syntax structure of a response to be sent to a computational unit (response syntax structure)" component 918 may include defining the syntax structure of the output (i.e., the response output of the LLM) to be read by the computational unit. These instructions in the prompt 902 may guide the LLM to precisely format the response output such that the computational unit can generate output messages and take action deterministically. For example, the prompt 902 about the syntax structure of the output messages may include "When you draft a message, make sure it starts with 'me to driver:' 'me to customer:' or 'me to employee:' depending on to whom you wish to send the message."

In another embodiment, a "syntax structure of a response to be sent to a computational unit (response syntax structure)" component 918 may be defined more precisely using JSON, XML, or other data interchange format.

A "prior messages" component 922 may include messages sent to this point of time including messages from the bot. The "prior messages" component 922 may also include additional information about the scenario that is known by one or more of the participants or may be known based on access to external data sources. By recreating the prompt 902 with all the prior messages in the conversation, the bot constrains the LLM to only provide the next set of messages in the conversation and defines what is known and not known about the conversation at that point of conversation. The prior messages may be provided following the syntax structure defined in the "syntax structure of incoming messages from a computational unit (incoming syntax structure)" component 916.

Some or all of these components may be included in the prompt 902 to ensure a proper output (i.e., the response output of the LLM) in the context of the scenario. Additional elements may be included in the prompt 902 to direct the LLM to other activity or to provide a further focus for response outputs provided by the LLM. The additional elements may include an input acknowledgment component 920, which may include defining the expectation and, potentially, the requirement to acknowledge input messages as part of the response output provided by the LLM. The additional elements may further include teaching examples to the LLM (i.e., a "few-shot" prompt), which include potential examples of previous conversations to further guide the behavior of the LLM.

FIG. 10 shows a schematic diagram 1000 illustrating various components of the prompt 902, according to an example embodiment. The components of the prompt 902 may be provided as a text input prompt using a natural language. An example prompt 1002 for the "activity" component 904 may include "today, you will be helping to facilitate a conversation." An example prompt 1004 for the "number of parties" component 906 may include "between three communication parties." An example prompt 1006 for the "scenario and roles" component 908 may be "a tow dispatch employee, a tow truck driver, and a customer in need of assistance." An example prompt 1008 for the "role of the bot in the scenario (bot role)" component 910 may be "They will each be communicating with you, but not each other. That is, you are the "middle-man" in the conversation. Your job is to communicate to each party whatever information they need as it comes up in the conversation." An example prompt 1010 for the "limits to prevent hallucination (hallucination limits)" component 912 may include "Or, if a communication party asks for information that is currently not available in the conversation."

Further, an example prompt 1012 for the "action to take in event of limit (hallucination action)" component 914 may include "draft a message to whichever communication party you think would have this information. If you do not think any communication party has this information, be honest and admit that you do not have the answer." An example prompt 1014 for the "syntax structure of incoming messages from a computational unit (incoming syntax structure)" component 916 may be "Messages from the customer begin with 'customer:' messages from the driver begin with 'driver:' and messages from the employee begin with 'employee:'."

An example prompt 1016 for the "syntax structure of a response to be sent to a computational unit (response syntax structure)" component 918 may include "When you draft a message, make sure it starts with 'me to driver:' 'me to customer,' or 'me to employee:' depending on to whom you wish to send the message. If you don't think you need to draft a message to anyone, just respond with '%%%'." An example prompt 1018 for the input acknowledgment component 920 may be "Feel free to respond to more than one party at once, with messages separated by new lines. Be certain to do this whenever the customer supplies you with new information or asks a question." An example prompt 1020 for the "prior messages" component 922 may include "Note that you may have already responded in the conversation. Here is the conversation so far: . . . ."

Depending on the input message, the LLM may or may not respond and propose alternative actions. In an example embodiment, when no response is required, if a participant responds, "Thank you!," the LLM can be trained or instructed to note that no response is necessary.

In an example embodiment, when it is a response with no interaction needed, if the participant asks, in the prompt, a question whose answer is available, the LLM may respond directly to the participant without involving any of the other participants.

In an example embodiment of responding and passing on information, if the participant supplies information that may be relevant to other participants (i.e., the other participants do not have the information) in the conversation, the LLM may compose communications to those other participants using the information provided by the participant.

In an example embodiment of responding and asking a question, if the participant seeks, in the prompt, information that is not available, the LLM may identify which other participant is most likely to be able to answer the participant and compose a communication to that other participant seeking information. The LLM may also inform the participant that the LLM has asked this question, as well as periodically update the participant on the status of the question. For example, if a driver has not responded after a set amount of time, the LLM may inform the participant of this. In an example embodiment of responding where no one is likely to know this information at this time, if the participant seeks information that none of the current participants is likely to be able to provide, the LLM may respond that no participants in the conversation are likely to know the information.

In an example embodiment, the system may include timestamps on prior messages sent by the plurality of communication parties and by the LLM and may include the current timestamp in the input prompt. The LLM may use this information to reason about questions or issues raised by one or more of the communication parties. For example, if at 2:00 PM a driver sends a message giving their ETA as 20 minutes and later at 2:15 PM the customer asks "Where's my package? When will it get here?", the LLM may respond, "The package should arrive in five minutes per the driver's ETA." If however, the customer asks the same question at 3:00 PM, the LLM may respond, "It looks like the driver is late. Let me ask when the driver expects to arrive with your package."

The system and the method of the present disclosure also contemplate additional features and enhancements. Specifically, the LLM may be further trained/tuned with typical multiparty conversation data from a particular scenario to better understand how and when to respond. In some example embodiments, the prompt may include new information that is posted to the computational unit from external data sources. For example, an external data source may periodically update the ETA or the assignment to a role. The prompt could also be augmented with examples of particularly good previous conversations using RAG or similar techniques. The computational unit may be configured to treat this new information as a trigger to the LLM to compose messages to the appropriate participants.

In some example embodiments, the system may enable automated detection of escalated issues or conflicts, with the capability to route such issues to a designated human supervisor or an advanced resolution mechanism. In an example embodiment, the system may further include the implementation of customizable privacy settings for each communication party to control the extent of information sharing. The system may be integrated with various communication platforms, including voice, text, and video.

In some example embodiments, an authorized party may be able to open direct lines of communication between any or all the communication parties in the conversation, including role-based access control to define the level of authority and control each participant has over the multiparty communication.

In an example embodiment, the response output from the LLM can either be original messages drafted by the LLM that synthesizes information in the conversation or direct quotations from one or more communication parties (if direct communication is enabled by the authorized party).

In some example embodiments, the system may enable managing multiple parallel communication threads for discussing multiple issues or topics simultaneously with all or a subset of the plurality of communication parties.

In some example embodiments, the system may enable dynamically creating, modifying, or disbanding communication groups based on the current context, issue, or requirements. For example, the LLM may determine that a new participant should be added to the conversation based on the prompt and direct the computational unit to reach out to that new participant using a communication medium of the new participant. If the answer to a question requires input from someone else in the scenario who is not yet included, the system may compose a message to that other person or system.

In some example embodiments, the system may be adapted to the scale of managing whole organizations as a "multiparty conversation." Each department or team, for example, can be considered a communication group, with the system managing the flow of information through the organization as a whole.

As the volume of communications increases for any given participant who may be involved in multiple simultaneous conversations, it may be useful to prioritize the communications to that participant. The system may be configured to manage all the conversations for a given participant, responding to conversations on behalf of the one participant and prioritizing the requests to that one participant based on their urgency or importance. In an example embodiment, the system may represent many participants who collectively occupy a single role in multiple simultaneous conversations and thereby distribute the request to respond among the participants based on availability and expertise of the individual participant.

In some example embodiments, the computational unit of the system may be configured to perform real-time progress tracking to monitor a status of ongoing issues and steps taken.

At the role assignment step when the participants are identified and assigned roles, the system can be informed of the language preferences of the participants, or the system can analyze the content of prior messages from the participants to infer their language preferences. The prompt to the LLM can include the language preferences, thereby allowing the LLM to analyze and respond to the individual participants in the language they prefer. For example, the system may support a conversation between a customer speaking Mandarin, a dispatcher speaking English, and a driver speaking Spanish.

In many multiparty, asynchronous conversations, there may be multiple communication parties that can answer a question posed by one of the participants. In this event, a first participant may be engaged in the conversation, but, if the first participant does not respond promptly, a second participant may be engaged into the conversation. The prompt can be configured to ask the LLM to return requests for information from several participants where all participants are asked for the information simultaneously; or each participant's request for information is in order with a time-delay instruction to the computational unit to only send the later request if the first request is not answered within the time limit; and the other participants may be provided with a notification that this request is being sent to other participants.

In a further embodiment, the prompt may be configured to ask the LLM to pose the question to multiple parties and synthesize a 'best' answer based on all the responses gathered. Further, the prompt may be configured to ask the LLM to gather information from external sources of information including the Internet or internally available data sources and to provide proper citations.

FIG. 11 illustrates an example dialog 1102 supported by the system for providing multiparty communication using an LLM, according to an example embodiment. The example dialog 1102 may include input messages 1104, text input prompts 1106 to be sent to the LLM, and response outputs 1108 received from the LLM.

In the example dialog 1102, an initial message shown as a first input message 1110 to start the conversation and set initial conditions is generated based on a template by the computational unit and using information about the service available from an external data source. The first input message 1110 may be sent by the system acting as a bot. The first input message 1110 is identified with the "employee" role. The first portion of the first input message 1110 may be, for example, as follows: "employee: Hi Deanna, this is Dispatch. It is my pleasure to assist you with your service request today. Our driver will meet you at 1801 30th Street Boulder 80301 to provide Battery service. If you have questions or need assistance, please reply to this text. If you do not want to receive texts, please reply STOP. Thank you!"

The input from the customer is the trigger that causes the bot to engage and pass the complete prompt shown in FIG. 10 along with the messages received up to this point of conversation to the LLM.

The customer may respond with two messages. The second portion of the first input message 1110 may include, for example, the following two messages received from the customer: "customer: When can I expect them to arrive?" and "customer: I am at 1821 30th."

The computational unit may pause before processing the input from the customer to see if the customer has any additional input. Upon receiving the input from the customer, the computational unit may generate a first text input prompt 1112 to be sent to the LLM. The first text input prompt 1112 may include, for example, the following text:

"Today, you will be helping to facilitate a conversation between three communication parties: a tow dispatch employee, a tow truck driver, and a customer in need of assistance. They will each be communicating with you, but not each other. That is, you are the "middleman" in the conversation. Your job is to communicate to each communication party whatever information they need as it comes up in the conversation. Or, if a communication party asks for information that is currently not available in the conversation, draft a message to whichever communication party you think would have this information. If you do not think any communication party has this information, be honest and admit that you do not have the answer. Messages from the customer begin with "customer:" messages from the driver begin with "driver:" and messages from the employee begin with "employee:" When you draft a message, make sure the message starts with "me to driver:" "me to customer:" or "me to employee:" depending on whom you wish to send the message to. If you do not think you need to draft a message to anyone, just respond with "% %%". Feel free to respond to more than one communication party at once, with messages separated by newlines. Be certain to do this whenever the customer supplies you with new information or asks a question. For instance, if the customer asks for the driver's ETA, you may want to draft a message to the driver as well as one to the customer informing them that you have asked the driver how long it will take. That is, one message beginning with "me to driver:" followed by a newline, followed by a message beginning with "me to customer:" Note that you may have already responded in the conversation. Here is the conversation so far:

employee: Hi Deanna, this is Dispatch. It is my pleasure to assist you with your service request today. Our driver will meet you at 1801 30th Street Boulder 80301 to provide Battery service. If you have questions or need assistance, please reply to this text. If you do not want to receive texts, please reply STOP. Thank you!

customer: When can I expect them to arrive?

customer: I am at 1821 30th"."

The LLM may receive and analyze the first text input prompt 1112 and may generate a first response output 1114 based on the following rules:

First, using the incoming syntax structure, the LLM may analyze the example dialog 1102 with messages received prior to this moment of time;

Next, the hallucination limit in the first text input prompt 1112 instructed the LLM not to simply make up an answer and respond to the customer. Without the hallucination limit, the LLM would likely answer "45 minutes" directly to the customer since this is a commonly predicted response for the LLM trained on historic conversations;

Instead, following the limit action, the LLM determines, based on its understanding of the scenario and roles and based on the training data, that the driver is the participant in the conversation that may have the information requested by the customer, and composes instructions to the computational unit to send a message to the driver;

Following the response syntax structure, the first response output 1114 starts with the syntactic instructions of "me to driver:" to instruct the computational unit to send the message to the participant who plays the role of the driver and ask to update the ETA. Based on the scenario and roles, the message to be sent to the driver is composed in the tone of the dispatcher based on the training data. A first part of the first response output 1114 may include the message for the driver and may be as follows: "me to driver: Hi, this is Dispatch. The customer is at 1821 30th Street. Please update us with your ETA.";

If the first text input prompt 1112 had indicated that the driver spoke a different language, the message to the driver may be in the driver's language. The LLM may also interpret the driver's response in their own language, and then respond to the other participants in the language of their choice;

Following the input acknowledgement instruction, the LLM also generates an acknowledgement to the customer, starting its response with "me to customer:" A second part of the first response output 1114 may include the message for the customer and may be as follows: "me to customer: Hi Deanna, I have asked the driver for an ETA. We will update you as soon as we have more information."

The computational unit receives the first response output 1114 that includes the message for the driver and the message for the customer. The computational unit may send the messages to the participants identified in the conversation as the driver and the customer using the communication medium of each participant.

The participant identified as the driver in the conversation responds with a message. The message from the driver is a second input message 1116 and acts as a trigger for the computational unit to compose a second text input prompt 1118 to be sent to the LLM. An example second input message 1116 may be as follows: "driver: be there in 30 ish."

The second text input prompt 1118 may include the first text input prompt 1112 completely, the prior messages composed previously by the LLM in the first response output 1114, and the second input message 1116 received from the driver.

The LLM analyzes the second text input prompt 1118 and generates a second response output 1120 based on the following rules:

Using the incoming syntax structure, the LLM analyzes the dialog of the conversation thus far including the first response output 1114 generated by the LLM itself;

The LLM follows the role of the bot and composes the second response output 1120 that includes a response directed to the customer with the new information provided by the driver. The second response output 1120 may include the following text: "me to customer: Hi Deanna, the driver estimates they will arrive in about 30 minutes.";

The LLM uses the tone of the dispatcher communicating with the customer based on the training data and translates the "be there in 30 ish" text to a more precise answer;

Following the response syntax structure, the second response output 1120 starts with the syntactic instructions of "me to customer:" to instruct the computational unit to send the message to the participant playing the role of the customer with the updated ETA.

The computational unit receives the second response output 1120 and sends the message to the participant identified in the conversation as the customer using the communication medium of the customer.

The participant identified as the customer in the conversation responds with a message. The message of the customer is a third input message 1122 and acts as a trigger for the computational unit to compose a third text input prompt 1124 to be sent to the LLM. The third input message 1122 may be for example, as follows: "customer: Ok, can you tell him it's actually the same address except 31st." The third text input prompt 1124 generated by the computational unit for the LLM includes the second text input prompt 1118 completely, the second response output 1120 previously generated by the LLM, and the third input message 1122 received from the customer.

The LLM may receive and analyze the third text input prompt 1124 and generate a third response output 1126 based on the following rules:

Using the incoming syntax structure, the LLM analyzes the dialog in the conversation thus far including response outputs generated by the LLM;

The LLM follows the role of the bot and composes the first part of the third response output 1126 that includes a message directed to the driver with the new information provided by the customer. The first part of the third response output 1126 may be, for example, as follows: "me to driver: Hi, the customer has updated their address to 1821 31st Street. Please update us with your ETA.";

Based on the training in natural language and interpretation of the hallucination limit, the LLM recognizes that it has sufficient information to interpret "the same address except 31st st" as "1821 31st Street." If the LLM did not have the prior information in the second text input prompt 1118 about the address, the LLM would have asked one of the participants to clarify;

Based on the training on the scenario, the LLM infers that a change in address may require a change in ETA and requests that additional information from the driver;

Following the response syntax structure, the third response output 1126 starts with the syntactic instructions of "me to driver:" to instruct the computational unit to send the message to the participant playing the role of the driver with the updated address;

Following the input acknowledgement instruction, the LLM also generates a second part of the third response output 1126 that includes an acknowledgement to the customer, starting its response with "me to customer:" The second part of the third response output 1126 may include, for example, the following text: "me to customer: Hi Deanna, I have asked the driver to update their ETA based on the new address. We will update you as soon as we have more information."

The computational unit may receive the third response output 1126 and send the message to the participants identified in the conversation as the driver and the customer via the communication medium of each participant.

The participant identified as the employee in the conversation responds with a fourth input message 1128 that acts as a trigger for the computational unit to compose a fourth text input prompt 1130 to be sent to the LLM. The fourth input message 1128 may include, for example, the following text: "employee: Tow company informed that Deanna has a new driver now, Doug."

The fourth text input prompt 1130 generated by the computational unit 118 includes the third text input prompt 1124 completely, the third response output 1126 previously generated by the LLM, and the fourth input message 1128 received from the employee.

The LLM receives and analyzes the fourth text input prompt 1130 and generates a fourth response output 1132 based on the following rules:

Using the incoming syntax, the LLM analyzes the dialog of the conversation with all messages received thus far including response outputs generated by the LLM;

The LLM follows the role of the bot and composes the fourth response output 1132 that includes a response directed to the customer with the new information provided by the employee. The fourth response output 1132 may include, for example, the following text: "me to customer: Hi Deanna, we have a new driver, Doug, who will be assisting you. We will update you as soon as we have more information.";

Based on the training data, the LLM may recognize that the information about the new driver should be shared with the customer and that the role of the driver role is "assisting you";

Following the response syntax structure, the fourth response output 1132 starts with the syntactic instructions of "me to customer:" to instruct the computational unit to send the message to the participant playing the role of the customer with the updated information.

The computational unit receives the fourth response output 1132 and sends the message to the participant identified in the conversation as the customer using the communication medium of the customer.

The participant identified in the conversation as the customer may respond with a fifth input message 1134 that acts as a trigger for the computational unit to compose a fifth text input prompt 1136 to be sent to the LLM. The fifth input message 1134 may include, for example, the following text: "customer: aw man . . . how long will that take now >:(". The fifth text input prompt 1136 may include the fourth text input prompt 1130 completely, the fourth response output 1132 generated by the LLM, and the fifth input message 1134 received from the customer.

The LLM receives and analyzes the fifth text input prompt 1136 and generates a fifth response output 1138 based on the following rules:

Using the incoming syntax structure, the LLM analyzes the dialog of the conversation with messages received thus far including response outputs generated by the LLM;

The LLM follows the role of the bot and composes a first part of the fifth response output 1138 that includes a response directed to the driver with the request for the ETA from the customer. The first part of the fifth response output 1138 may include, for example, the following text: "me to driver: Hi Doug, the customer has asked for an ETA. Please update us with your ETA.";

Based on the training data, the LLM reframes the fifth input message 1134 received form the customer that includes the emoji as a request for the ETA. The request in this case shields the driver from the frustration of the customer, which can help maintain the morale of participants who might otherwise face abusive language from the other participants;

Following the response syntax structure, the first part of the fifth response output 1138 starts with the syntactic instructions of "me to driver:" to instruct the computational unit to send the message to the participant playing the role of the driver with the updated information;

Following the input acknowledgement instruction, the LLM also generates a second part of the fifth response output 1138 that includes an acknowledgement to the customer, starting its response with "me to customer:" The second part of the fifth response output 1138 may include, for example, the following text: "me to customer: Hi Deanna, I have asked the driver for an ETA. We will update you as soon as we have more information."

The computational unit may receive the fifth response output 1138 and send the messages to the participants identified in the conversation as the driver and the customer using the communication medium of each participant.

The participant identified as the driver in the conversation may respond with a sixth input message 1140 that acts as a trigger for the computational unit to compose a sixth text input prompt 1142 to be sent to the LLM. The sixth input message 1140 may include, for example, the following text: "driver: I'm arriving as we speak." The sixth text input prompt 1142 may include the fifth text input prompt 1136 completely, the fifth response output 1138 composed previously by the LLM, and the sixth input message 1140 received from the driver.

The LLM may receive and analyze the sixth text input prompt 1142 to generate a sixth response output 1144 based on the following rules:

Using the incoming syntax structure, the LLM analyzes the dialog of the conversation with all messages received thus far including responses generated by the LLM;

The LLM follows the role of the bot and composes the sixth response output 1144 that includes a response directed to the customer with the new information provided by the driver. The sixth response output 1144 may include, for example, the following text: "Hi Deanna, the driver is arriving now.";

Following the response syntax structure, the sixth response output 1144 starts with the syntactic instructions of "me to customer:" to instruct the computational unit to send the message to the participant playing the role of the customer role with the updated ETA.

The computational unit receives the sixth response output 1144 and sends the message to the participant identified in the conversation as the customer using the communication medium of the customer.

Figure 12:
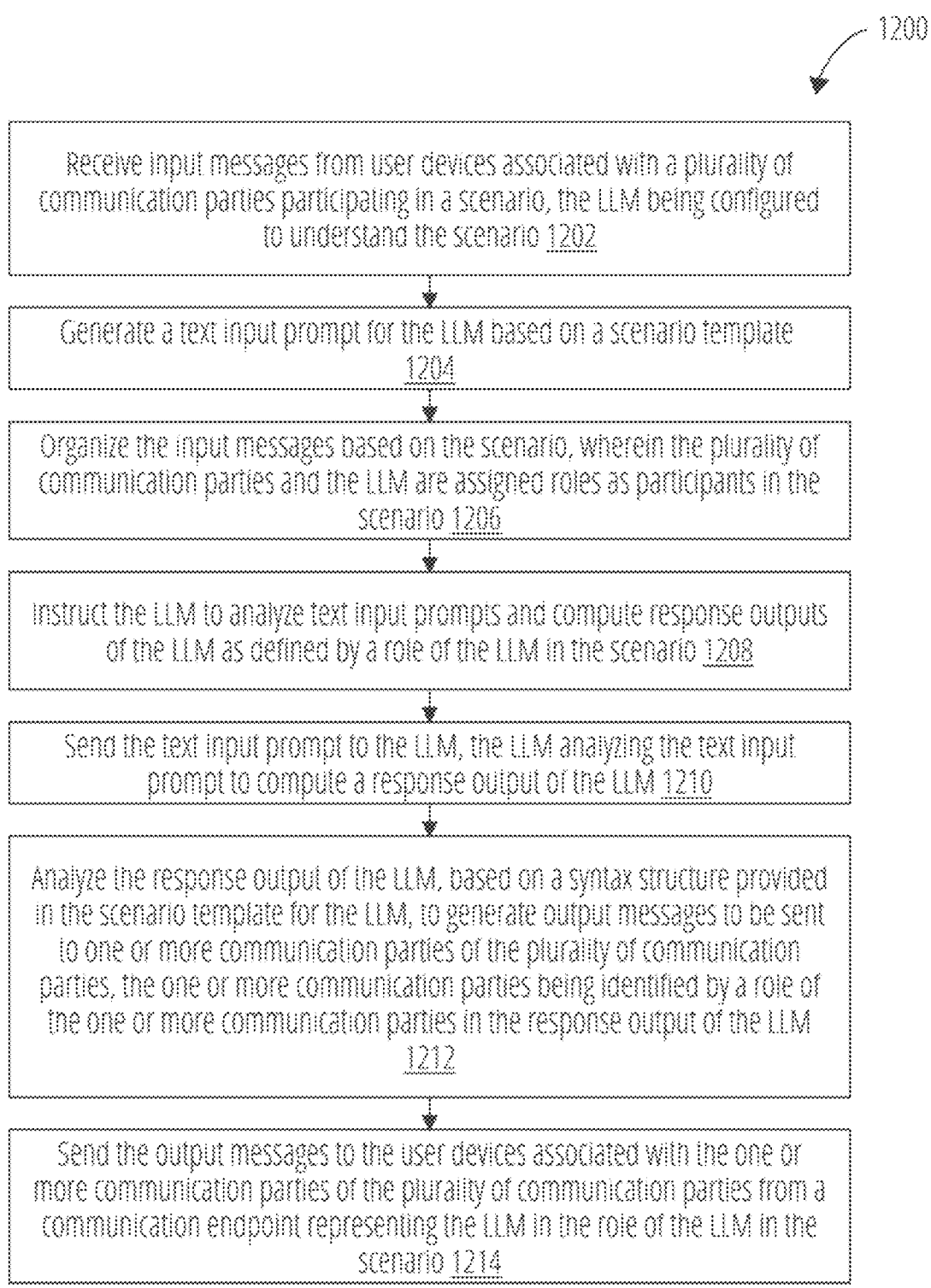
FIG. 12 is a flow chart of a method for providing multiparty communication using an LLM, according to an example embodiment.

FIG. 12 is a flow chart of a method 1200 for providing multiparty communication using an LLM, according to an example embodiment. In some embodiments, the operations may be combined, performed in parallel, or performed in a different order. The method 1200 may also include additional or fewer operations than those illustrated. The method 1200 may be performed by processing logic that may comprise hardware (e.g., decision making logic, dedicated logic, programmable logic, and microcode), software (such as software run on a general-purpose computer system or a dedicated machine), or a combination of both. In an example embodiment, the operations of the method 1200 may be performed by the computational unit 118 and/or the AI unit 122 shown in FIG. 1.

The method 1200 may commence in block 1202 with receiving input messages from user devices associated with a plurality of communication parties participating in an instance of a scenario. The LLM may be configured to understand the scenario. In an example embodiment, the input messages may originate from a plurality of sources. The plurality of sources is shown as external data source 708 in FIG. 7. The plurality of sources may include one or more of the following: data events, machines, sensors, further bots, and further sources such as databases or systems accessible to a communication party of the plurality of communication parties and enterprises associated with the plurality of communication parties.

In block 1204, the method 1200 may continue with generating a text input prompt for the LLM based on a scenario template. The scenario template may include rules to organize, in block 1206, the input messages based on the scenario. The plurality of communication parties and the LLM may be assigned roles as participants in the scenario. The scenario template may further include rules to instruct, in block 1208, the LLM to analyze text input prompts and compute response outputs of the LLM as defined by a role of the LLM in the scenario.

In an example embodiment, the scenario template may include an activity in which the LLM and the plurality of communication parties are to be participating. The scenario template may further include a number of communication parties of the plurality of communication parties. In some example embodiments, the scenario template may further include a reference to the scenario. The scenario may provide a context for the activity. The LLM may be configured to understand the scenario based on at least one of the following: pre-training of the LLM, fine-tuning of the LLM with additional training data, and by incorporating additional data into the prompt using RAG or similar methods. The scenario template may further include the roles of each of the plurality of communication parties assigned based on the scenario. The scenario template may further include the role of the LLM assigned based on the scenario and the activity. In some example embodiments, the scenario template may further include a first syntax structure and a second syntax structure. The first syntax structure may be used to structure the input messages from the plurality of communication parties and assign the input messages based on the roles in the scenario. The second syntax structure may be used by the LLM to structure the response output to identify a content and desired recipients of the output messages to be sent on behalf of the LLM.

In some example embodiments, the scenario template may include further rules on an action to be taken by the LLM when the LLM is requested to provide information that is not included in the text input prompt. The further rules may include generating a message to request the information from a communication party of the plurality of communication parties. The communication party of the plurality of communication parties may be expected to have the information based on a role of the communication party of the plurality of communication parties or the rules in the scenario template.

In some example embodiments, the further rules may include generating a message to request the information from an external data source. The external data source may include one or more of the following: further machines, sensors, bots, and further sources such as databases or systems accessible to a communication party of the plurality of communication parties or enterprises associated with the communication party of the plurality of communication parties. The communication party of the plurality of communication parties may be expected to have the information based on the role of the communication party of the plurality of communication parties or the rules in the scenario template.

In an example embodiment, the scenario template may include examples of previous conversations to provide a guidance to the LLM on how to respond.

In block 1210, the method 1200 may proceed with sending the text input prompt to the LLM. The LLM may analyze the text input prompt to compute a response output of the LLM.

In block 1212, the method 1200 may include analyzing the response output of the LLM. The analysis may be performed based on a syntax structure specified in the scenario template for the LLM. Based on the analysis of the response output of the LLM, output messages to be sent to one or more communication parties of the plurality of communication parties may be generated. The one or more communication parties may be identified in the response output of the LLM by a role of the one or more communication parties.

In block 1214, the method 1200 may proceed with sending the output messages to the user devices associated with the one or more communication parties of the plurality of communication parties from a communication endpoint representing the LLM in the role of the LLM in the scenario.

Sending output messages to the user devices associated with the one or more communication parties of the plurality of communication parties may result in an automatic notification to the communication party that a new message is received. Depending on the message content, the scenario, and the role of the receiving communication party, the receiving communication party may be expected to follow-up with a response or not. For example, if the response output to the receiving communication party is "Thank you," no follow-up is required. If the response output to the receiving communication party is "Please provide the updated ETA for the delivery" a follow-up is required. To fully understand if follow-up is required, all the prior messages must be reviewed in order to identify still unresolved expectations from a prior cycle of messages.

In an example embodiment, after block 1214, the method may proceed with the passing the prior messages, including messages from the LLM, to a separate LLM configured with a tagging prompt to determine when follow-up by one or more of the plurality of communication parties is expected.

FIG. 13 shows a schematic diagram 1302 illustrating various components of the tagging prompt 1304, according to an example embodiment. The tagging prompt uses many of the same components of a prompt 902 shown in FIG. 9. The components 1306 of the prompt 1304 for the "activity" component 1308 may include "today, you will be helping with a conversation about a delivery." An example prompt 1304 for the "scenario and roles" component 1312 may be "The people in the conversation are the customer receiving the delivery, the delivery dispatcher, the delivery driver, and an assistant that mediates between them," with the "number of parties" component 1310 implied by the number of parties listed. Note that the "assistant that mediates between them" in this list refers to the bot's role in the conversation to distinguish the messages sent by the bot in the conversation. An example prompt 1304 for the "role of the bot in the scenario" component 1314 in this case refers to the role of the tagging bot which may be "You are Angie, a customer service expert with 30 years of experience. Your job is to use your expertise to determine whether anyone is waiting on anyone else to respond." An example prompt 1304 for the "syntax structure of a response to be sent to a computational unit (response syntax structure)" component 1318 may be "Is anyone waiting for anyone else to respond right now? Please reply with a JSON dictionary containing the keys "customer", "driver", and "dispatcher", each of which corresponds to a Boolean value that is True if anyone is waiting on that party to respond, and False otherwise. Do not respond with any other text besides the dictionary."

The method 1200 may include repeating operations in a further cycle each time a further input message is received from any of the plurality of communication parties with prior messages. The prior messages may include messages from the LLM included as the input messages in a further text input prompt following the scenario template. The repeating of the operations in the further cycle may be triggered based on one or more of the following: an algorithm, an external data source, the LLM analyzing the input messages to determine if the LLM is to engage in the further cycle, and so forth.

In an example embodiment, the LLM may be configured to acknowledge a receipt of a message from a communication party of the plurality of communication parties.

In some embodiments, the LLM may be configured to send instructions and messages to one or more external systems. Additionally, the LLM may be configured to perform an action or trigger a workflow in the one or more external systems, or to modify or switch its own prompt. Moreover, LLM may be configured to ascertain whether the LLM has gathered necessary input to perform the action or trigger the workflow. Based on the analysis of a conversation associated with the multiparty communication, the LLM may be configured to estimate a certainty that the action should be taken and evaluate the certainty against a threshold set by an organization associated with the one or more external systems. When the certainty is above the threshold, the LLM may execute the action or trigger the workflow based on the necessary input gathered from the multiparty communication. When the certainty is below the threshold, the LLM may send a message to an appropriate party of the plurality of communication parties for confirmation or instruction about how to proceed.

In an example embodiment, the LLM may be configured to generate code in a computer language associated with the one or more external systems. The LLM may use the code to send instructions to the one or more external systems, send messages to the one or more external systems, perform an action in the one or more external systems, trigger a workflow in the one or more external systems, and for other operations associated with the one or more external systems.

In an example embodiment, the LLM may be configured to understand a language of the one or more communication parties of the plurality of communication parties. The LLM may communicate with the one or more communication parties in the language chosen by the one or more communication parties in the multiparty communication. Additionally, the LLM may automatically translate messages of a first communication party of the one or more communication parties from a first language chosen by the first communication party to a second language chosen by a second communication party of the one or more communication parties.

In an example embodiment, the LLM may be configured to recognize that a further communication party of the one or more communication parties speaks a further language, different from the language and suggests that the further communication party translate messages of the further communication party into the further language on behalf of the third communication party.

In an example embodiment, the LLM may be configured to orchestrate a plurality of dialogues of one or more subsets of the plurality of communication parties as part of the same conversation.

In an example embodiment, the input messages may be associated with certain modality, such as text, an image, audio, video, a location, and any other data type or data format. A modality may refer to a category of data defined by how the data are received, represented, and understood. For example, a customer may take a picture of a damaged package at the front door and send to the system along with a message "This is unacceptable!". The LLM may receive the message and the picture, combine the input from the text of the message and the picture to understand that this is a picture of the damaged package, and, based on the analysis of the input, offer the customer or the agent help resolving the delivery issue, for example, by issuing a refund.

In an example embodiment, the LLM may be configured to compose the response output that has the modality corresponding to the modality of the input messages.

Moreover, the LLM may be configured to send messages to systems controlling notifications of further messages from communication parties of the plurality of communication parties to further communication parties of the plurality of communication parties. Additionally, the LLM may be configured to prevent sending a notification of a further incoming message to one or more further communication parties of the plurality of communication parties when an attention of the one or more further communication parties is unnecessary. In an example embodiment, the LLM may be configured to cause sending a notification of a further incoming message to one or more further communication parties of the plurality of communication parties. The notification may selectively include a measure of an urgency of a response expected from the one or more further communication parties.

In example embodiment, the LLM may be configured to recognize that a subset of the plurality of communication parties is communicating with each other directly. Based on the recognition, the LLM may decide not to intervene in the conversation. Specifically, the LLM may refrain from intervening in the multiparty communication between the subset of the plurality of communication parties.

The method 1200 may further include instructing the LLM, in the text input prompt, to add a communication party to the plurality of communication parties. The communication party may be added based on one or more of the following: a milestone in the scenario, an external event, a request from a further communication party, a requirement for information that is not available in the text input prompt or among the plurality of communication parties, a demand provided in the scenario and inferred by the LLM, and so forth. Based on the text input prompt, messages may be sent to systems in control of the plurality of communication parties such that the communication party is invited to join the plurality of communication parties.

The method 1200 may further include instructing the LLM, in the text input prompt, to drop a communication party of the plurality of communication parties. The dropping of the communication party may be performed based on one or more of the following: a milestone in the scenario, an external event, a request from a further communication party, a request from the communication party to be dropped, a demand provided in the scenario and inferred by the LLM, and so forth. Based on the text input prompt, messages may be sent to systems in control of the plurality of communication parties such that the communication party is dropped from the plurality of communication parties.

Figure 14:
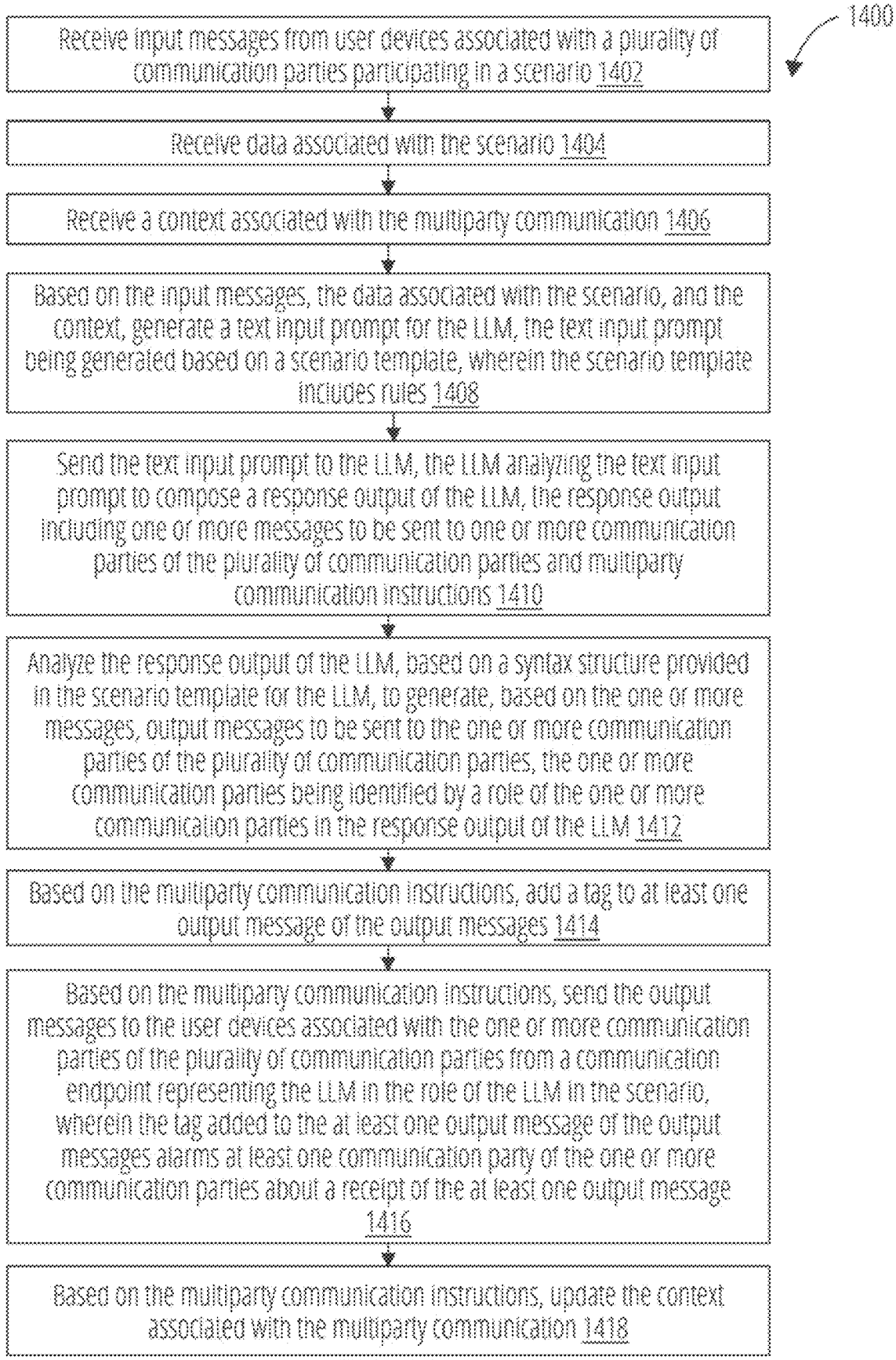
FIG. 14 is a flow chart of a method for providing multiparty communication using an LLM, according to an example embodiment.

FIG. 14 is a flow chart of a method 1400 for providing multiparty communication using an LLM, according to an example embodiment. In some embodiments, the operations may be combined, performed in parallel, or performed in a different order. The method 1400 may also include additional or fewer operations than those illustrated. The method 1400 may be performed by processing logic that may comprise hardware (e.g., decision making logic, dedicated logic, programmable logic, and microcode), software (such as software run on a general-purpose computer system or a dedicated machine), or a combination of both. In an example embodiment, the operations of the method 1400 may be performed by the computational unit 118 and/or the AI unit 122 shown in FIG. 1.

The method 1400 may commence in block 1402 with receiving input messages from user devices associated with a plurality of communication parties participating in a scenario. In block 1404, the method 1400 may include receiving data associated with the scenario. The data associated with the scenario may include data related to situations associated with the multiparty communication (e.g., a type of service to be provided), objectives of the multiparty communication, participants of the multiparty communication, examples of previous conversations of this type, and so forth.

In block 1406, the method 1400 proceeds with receiving a context associated with the multiparty communication. In an example embodiment, the context may be received from a TMS/CRM system associated with one of the plurality of communication parties. The context may include prior messages associated with prior conversations between any of the communication parties, business rules of the service provider or the communication party that provides the service on behalf of the service provider, order details, time the service requested to be provided, and so forth.

In block 1408, the method 1400 may proceed with generating a text input prompt for the LLM based on the input messages, the data associated with the scenario, and the context. The text input prompt may be generated based on a scenario template. The scenario template may include rules to organize the input messages based on the scenario. The plurality of communication parties and the LLM may be assigned roles as participants in the scenario. The scenario template may include rules to instruct the LLM to analyze text input prompts and compute response outputs of the LLM as defined by a role of the LLM in the scenario. In an example embodiment, the rules to instruct the LLM to analyze text input prompts and compute response outputs may include multiparty communication questions, such as who to respond to, how to respond, how to update, and who needs to follow-up.

In block 1410, the method 1400 may proceed with sending the text input prompt to the LLM. The LLM may analyze the text input prompt to compose a response output of the LLM. The response output may include one or more messages to be sent to one or more communication parties of the plurality of communication parties. The response output may further include multiparty communication instructions. The multiparty communication instructions may include answers to the one or more multiparty communication questions.

In block 1412, the method 1400 may proceed with analyzing the response output of the LLM based on a syntax structure specified in the scenario template for the LLM. Based on the analysis of the response output and the one or more messages provided in the response output, output messages to be sent to the one or more communication parties of the plurality of communication parties may be generated. The one or more communication parties may be identified by a role of the one or more communication parties in the response output of the LLM.

In block 1414, the method 1400 may proceed with adding, based on the multiparty communication instructions, a tag to at least one output message of the output messages. In block 1416, the method 1400 may proceed with sending, based on the multiparty communication instructions, the output messages to the user devices associated with the one or more communication parties of the plurality of communication parties from a communication endpoint representing the LLM in the role of the LLM in the scenario. The tag added to the at least one output message of the output messages may alert at least one communication party of the one or more communication parties about a receipt of the at least one output message by the at least one communication party.

In block 1418, the method 1400 may proceed with updating, based on the multiparty communication instructions, the context associated with the multiparty communication. In an example embodiment, updating the context may include updating information associated with the multiparty communication in the TMS/CRM system associated with one of the plurality of communication parties.

Figure 15:
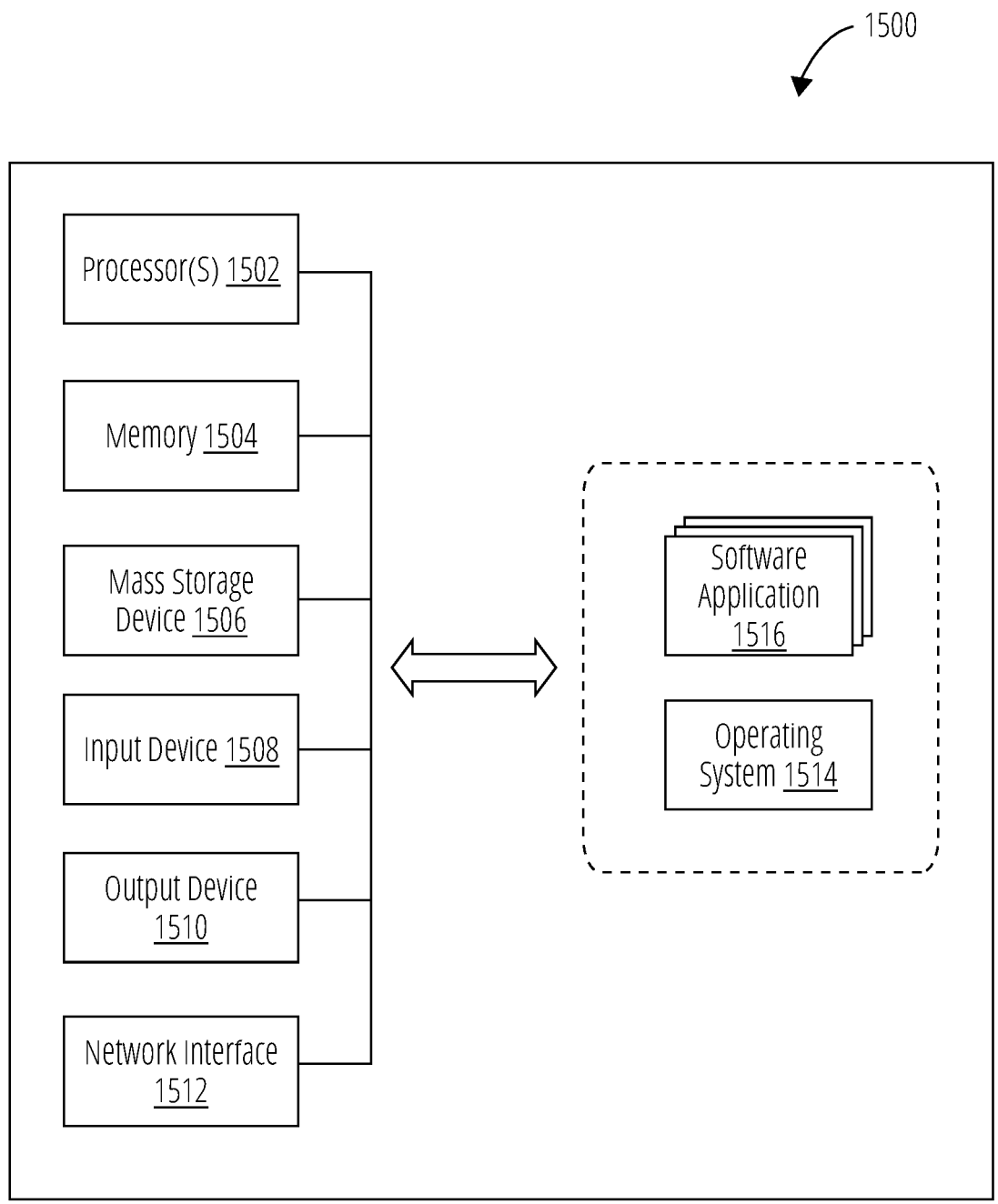
FIG. 15 is a high-level block diagram illustrating an example computer system, within which a set of instructions for causing the machine to perform any one or more of the methodologies discussed herein can be executed.

FIG. 15 is a high-level block diagram illustrating an example computer system 1500, within which a set of instructions for causing the machine to perform any one or more of the methodologies discussed herein can be executed. The computer system 1500 may include, refer to, or be an integral part of, one or more of a variety of types of devices, such as a general-purpose computer, a desktop computer, a laptop computer, a tablet computer, a netbook, a mobile phone, a smartphone, a personal digital assistant, a smart television device, and a server, among others. In some embodiments, the computer system 1500 is an example of a system for providing multiparty communication using an LLM. Notably, FIG. 15 illustrates just one example of the computer system 1500 and, in some embodiments, the computer system 1500 may have fewer elements/modules than shown in FIG. 15 or more elements/modules than shown in FIG. 15.

The computer system 1500 may include one or more processor(s) 1502, a memory 1504, one or more mass storage devices 1506, one or more input devices 1508, one or more output devices 1510, and a network interface 1512. The processor(s) 1502 are, in some examples, configured to implement functionality and/or process instructions for execution within the computer system 1500. For example, the processor(s) 1502 may process instructions stored in the memory 1504 and/or instructions stored on the mass storage devices 1506. Such instructions may include components of an operating system 1515 or software applications 1516. The computer system 1500 may also include one or more additional components not shown in FIG. 15.

The memory 1504, according to one example, is configured to store information within the computer system 1500 during operation. The memory 1504, in some example embodiments, may refer to a non-transitory computer-readable storage medium or a computer-readable storage device. In some examples, the memory 1504 is a temporary memory, meaning that a primary purpose of the memory 1504 may not be long-term storage. The memory 1504 may also refer to a volatile memory, meaning that the memory 1504 does not maintain stored contents when the memory 1504 is not receiving power. Examples of volatile memories include random access memories (RAM), dynamic random access memories (DRAM), static random access memories (SRAM), and other forms of volatile memories known in the art. In some examples, the memory 1504 is used to store program instructions for execution by the processor(s) 1502. The memory 1504, in one example, is used by software (e.g., the operating system 1514 or the software applications 1516). Generally, the software applications 1516 refer to software applications suitable for implementing at least some operations of the methods for providing multiparty communication using an LLM as described herein.

The mass storage devices 1506 may include one or more transitory or non-transitory computer-readable storage media and/or computer-readable storage devices. In some embodiments, the mass storage devices 1506 may be configured to store greater amounts of information than the memory 1504. The mass storage devices 1506 may further be configured for long-term storage of information. In some examples, the mass storage devices 1506 include non-volatile storage elements. Examples of such non-volatile storage elements include magnetic hard discs, optical discs, solid-state discs, flash memories, forms of electrically programmable memories (EPROM) or electrically erasable and programmable memories, and other forms of non-volatile memories known in the art.

The input devices 1508, in some examples, may be configured to receive input from a user through tactile, audio, video, or biometric channels. Examples of the input devices 1508 may include a keyboard, a keypad, a mouse, a trackball, a touchscreen, a touchpad, a microphone, one or more video cameras, image sensors, fingerprint sensors, or any other device capable of detecting an input from a user or other source, and relaying the input to the computer system 1500, or components thereof.

The output devices 1510, in some examples, may be configured to provide output to a user through visual or auditory channels. The output devices 1510 may include a video graphics adapter card, a liquid crystal display monitor, a light emitting diode (LED) monitor, an organic LED monitor, a sound card, a speaker, a lighting device, a LED, a projector, or any other device capable of generating output that may be intelligible to a user. The output devices 1510 may also include a touchscreen, a presence-sensitive display, or other input/output capable displays known in the art.

The network interface 1512 of the computer system 1500, in some example embodiments, can be utilized to communicate with external devices via one or more data networks such as one or more wired, wireless, or optical networks including, for example, the Internet, intranet, LAN, WAN, cellular phone networks, Bluetooth radio, an IEEE 902.11-based radio frequency network, and Wi-Fi Networks®, among others. The network interface 1512 may be a network interface card, such as an Ethernet card, an optical transceiver, a radio frequency transceiver, or any other type of device that can send and receive information.

The operating system 1514 may control one or more functionalities of the computer system 1500 and/or components thereof. For example, the operating system 1514 may interact with the software applications 1516 and may facilitate one or more interactions between the software applications 1516 and components of the computer system 1500. As shown in FIG. 15, the operating system 1514 may interact with or be otherwise coupled to the software applications 1516 and components thereof. In some embodiments, the software applications 1516 may be included in the operating system 1514. In these and other examples, virtual modules, firmware, or software may be part of the software applications 1516.

Thus, systems and methods for providing multiparty communication using an LLM have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A method for providing multiparty communication using a large language model (LLM), the method being implemented by a computer system, the method comprising:

receiving input messages from user devices associated with a plurality of communication parties participating in a scenario, the LLM being configured to understand the scenario;

generating a text input prompt for the LLM based on a scenario template, wherein the scenario template includes rules to:

organize the input messages based on the scenario, wherein the plurality of communication parties and the LLM are assigned roles as participants in the scenario; and instruct the LLM to analyze text input prompts and compute response outputs of the LLM as defined by an assigned role of the LLM in the scenario, the text input prompts including the text input prompt;

sending the text input prompt to the LLM, the LLM analyzing the text input prompt to compose a response output of the LLM;

analyzing the response output of the LLM, based on a syntax structure provided in the scenario template for the LLM, to generate output messages to be sent to one or more communication parties of the plurality of communication parties, the one or more communication parties being identified by a role of the one or more communication parties in the response output of the LLM; and sending the output messages to the user devices associated with the one or more communication parties of the plurality of communication parties from a communication endpoint representing the LLM in the assigned role of the LLM in the scenario.

2. The method of claim 1, wherein the scenario template includes:

an activity in which the LLM and the plurality of communication parties are to be participating;

a number of communication parties of the plurality of communication parties;

a reference to the scenario, the scenario providing a context for the activity, wherein the LLM is configured to understand the scenario based on one of the following: pre-training of the LLM, fine-tuning of the LLM with additional training data, and by incorporating additional data into the text input prompt using Retrieval Augmented Generation;

the roles of each of the plurality of communication parties assigned based on the scenario;

the assigned role of the LLM assigned based on the scenario and the activity;

a first syntax structure used to structure the input messages from the plurality of communication parties and assign the input messages based on the roles in the scenario; and a second syntax structure used by the LLM to structure the response output to identify a content and desired recipients of the output messages to be sent on behalf of the LLM.

3. The method of claim 1, further comprising repeating operations in a further cycle each time a further input message is received from the one or more communication parties of the plurality of communication parties with prior messages, the prior messages including messages from the LLM, included as the input messages in a further text input prompt following the scenario template.

4. The method of claim 3, wherein the repeating the operations in the further cycle is triggered based on one or more of the following: an algorithm, an external data source, and the LLM analyzing the input messages to determine if the LLM is to engage in the further cycle.

5. The method of claim 1, wherein the input messages and other elements of the text input prompt originate from sources, the sources including one or more of the following: data events, machines, sensors, further bots, and further sources accessible to a communication party of the plurality of communication parties and enterprises associated with the plurality of communication parties.

6. The method of claim 1, wherein the input messages are associated with one or more modalities, the one or more modalities including one of the following: text, an image, audio, video, and a location;

wherein the LLM is configured to compose the response output having the one or more modalities associated with the input messages.

7. The method of claim 1, wherein the scenario template includes further rules on an action to be taken by the LLM when the LLM is requested to provide information that is not included in the text input prompt;

the further rules include one or more of the following:

generating a message to request the information from a communication party of the plurality of communication parties, wherein the communication party of the plurality of communication parties is expected, based on a role of the communication party of the plurality of communication parties or the rules in the scenario template, to have the information; and generating a further message to request the information from an external data source, the external data source including one or more of the following: further machines, sensors, bots, and further sources including systems, databases and other sources accessible to the communication party of the plurality of communication parties or enterprises associated with the communication party of the plurality of communication parties, wherein the communication party of the plurality of communication parties is expected, based on the role of the communication party of the plurality of communication parties or the rules in the scenario template, to have the information.

8. The method of claim 1, wherein the LLM is configured to acknowledge a receipt of a message from a communication party of the plurality of communication parties.

9. The method of claim 1, wherein the LLM is configured to:

analyze prior messages, the prior messages including messages from the LLM;

determine when follow-up by one or more of the plurality of communication parties is expected; and cause a notification to be sent to the respective communication party.

10. The method of claim 1, wherein the LLM is configured to:

recognize that a subset of the plurality of communication parties is communicating with each other directly; and in response to the recognition, refrain from intervening in the multiparty communication between the subset of the plurality of communication parties.

11. The method of claim 1, wherein the LLM is configured to perform one or more of the following:

send instructions and messages to one or more external systems;

perform an action in the one or more external systems;

trigger a workflow in the one or more external systems;

ascertain that the LLM has gathered necessary input to perform the action or trigger the workflow;
estimate, based on an analysis of a conversation associated with the multiparty communication, a certainty that the action is to be taken;
evaluate the certainty against a threshold set by an organization associated with the one or more external systems;
based on the evaluation that the certainty is above the threshold, execute the action or trigger the workflow based on the necessary input gathered from the multiparty communication; and
when the certainty is below the threshold, send a message to an appropriate party of the plurality of communication parties for a confirmation or an instruction about how to proceed.

12. The method of claim 1, wherein the LLM is configured to:
generate a code in a computer language associated with one or more external systems; and
based on the code, perform or more of the following:
send instructions to the one or more external systems;
send messages to the one or more external systems;
perform an action in the one or more external systems; and
trigger a workflow in the one or more external systems.

13. The method of claim 1, wherein the LLM is configured to:
understand a language of the one or more communication parties of the plurality of communication parties;
communicate with the one or more communication parties in the language chosen by the one or more communication parties in the multiparty communication; and
automatically translate messages of a first communication party of the one or more communication parties from a first language chosen by the first communication party to a second language chosen by a second communication party of the one or more communication parties.

14. The method of claim 1, wherein the LLM is configured to orchestrate a plurality of dialogues of one or more subsets of the plurality of communication parties as part of the same conversation associated with the multiparty communication.

15. The method of claim 1, further comprising instructing the LLM, in the text input prompt, to perform one or more of the following:
add a communication party to the plurality of communication parties based on one or more of the following: a milestone in the scenario, an external event, a request from a further communication party, a requirement for information that is not available in the text input prompt or among the plurality of communication parties, and a demand provided in the scenario and inferred by the LLM;
based on the text input prompt, send messages to systems in control of the plurality of communication parties such that the communication party is invited to join the plurality of communication parties;
drop the communication party of the plurality of communication parties based on one or more of the following: the milestone in the scenario, the external event, the request from the further communication party, a request from the communication party to be dropped, and the demand provided in the scenario and inferred by the LLM; and,
based on the text input prompt, send further messages to systems in control of the plurality of communication parties such that the communication party is dropped from the plurality of communication parties.

16. A system for providing multiparty communication using a large language model (LLM), the system comprising:
a processor; and
a memory storing instructions that, when executed by the processor, configure the processor to:
receive input messages from user devices associated with a plurality of communication parties participating in a scenario, the LLM being configured to understand the scenario;
generate a text input prompt for the LLM based on a scenario template, wherein the scenario template includes rules to:
organize the input messages based on the scenario, wherein the plurality of communication parties and the LLM are assigned roles as participants in the scenario; and
instruct the LLM to analyze text input prompts and compute response outputs of the LLM as defined by an assigned role of the LLM in the scenario, the text input prompts including the text input prompt;
send the text input prompt to the LLM, the LLM analyzing the text input prompt to compose a response output of the LLM;
analyze the response output of the LLM, based on a syntax structure provided in the scenario template for the LLM, to generate output messages to be sent to one or more communication parties of the plurality of communication parties, the one or more communication parties being identified by a role of the one or more communication parties in the response output of the LLM; and
send the output messages to the user devices associated with the one or more communication parties of the plurality of communication parties from a communication endpoint representing the LLM in the assigned role of the LLM in the scenario.

17. The system of claim 16, wherein the scenario template includes:
an activity in which the LLM and the plurality of communication parties are to be participating;
a number of communication parties of the plurality of communication parties;
a reference to the scenario, the scenario providing a context for the activity, wherein the LLM is configured to understand the scenario based on one of the following: pre-training of the LLM, fine-tuning of the LLM with additional training data, and by incorporating additional data into the text input prompt using Retrieval Augmented Generation;
the roles of each of the plurality of communication parties assigned based on the scenario;
the assigned role of the LLM assigned based on the scenario and the activity;
a first syntax structure used to structure the input messages from the plurality of communication parties and assign the input messages based on the roles in the scenario; and
a second syntax structure used by the LLM to structure the response output to identify a content and desired recipients of the output messages to be sent on behalf of the LLM.

18. The system of claim 16, wherein the processor is further configured to repeat operations in a further cycle each time a further input message is received from any of the plurality of communication parties with prior messages, the prior messages including messages from the LLM included as the input messages in a further text input prompt following the scenario template.

19. The system of claim 18, wherein the repeating the operations in the further cycle is triggered based on one or more of the following: an algorithm, an external data source, and the LLM analyzing the input messages to determine if the LLM is to engage in the further cycle.

20. The system of claim 16, wherein the input messages and other elements of the text input prompt originate from sources, the sources including one or more of the following: data events, machines, sensors, further bots, and further sources accessible to a communication party of the plurality of communication parties and enterprises associated with the plurality of communication parties.

21. The system of claim 16, wherein the input messages are associated with one or more modalities, the one or more modalities including one of the following: text, an image, audio, video, and a location;
   wherein the LLM is configured to compose the response output having the one or more modalities associated with the input messages.

22. The system of claim 16, wherein the scenario template includes further rules on an action to be taken by the LLM when the LLM is requested to provide information that is not included in the text input prompt and wherein the further rules include one or more of the following:
   generating a message to request the information from a communication party of the plurality of communication parties, wherein the communication party of the plurality of communication parties is expected, based on a role of the communication party of the plurality of communication parties or the rules in the scenario template, to have the information; and
   generating a further message to request the information from an external data source, the external data source including one or more of the following: further machines, sensors, bots, and further sources including systems, databases and other sources accessible to the communication party of the plurality of communication parties or enterprises associated with the communication party of the plurality of communication parties, wherein the communication party of the plurality of communication parties is expected, based on the role of the communication party of the plurality of communication parties or the rules in the scenario template, to have the information.

23. The system of claim 16, wherein the LLM is configured to:
   analyze prior messages, the prior messages including messages from the LLM;
   determine when follow-up by one or more of the plurality of communication parties is expected; and
   cause a notification to be sent to the respective communication party.

24. The system of claim 16, wherein the LLM is configured to:
   recognize that a subset of the plurality of communication parties is communicating with each other directly; and
   in response to the recognition, refrain from intervening in the multiparty communication between the subset of the plurality of communication parties.

25. The system of claim 16, wherein the LLM is configured to perform one or more of the following:
   send further instructions and messages to one or more external systems;
   perform an action in the one or more external systems;
   trigger a workflow in the one or more external systems;
   ascertain that the LLM has gathered necessary input to perform the action or trigger the workflow;
   estimate, based on an analysis of a conversation associated with the multiparty communication, a certainty that the action is to be taken;
   evaluate the certainty against a threshold set by an organization associated with the one or more external systems;
   based on the evaluation that the certainty is above the threshold, execute the action or trigger the workflow based on the necessary input gathered from the multiparty communication; and
   when the certainty is below the threshold, send a message to an appropriate party of the plurality of communication parties for a confirmation or an instruction about how to proceed.

26. The system of claim 16, wherein the LLM is configured to:
   generate a code in a computer language associated with one or more external systems; and
   based on the code, perform or more of the following:
      send further instructions to the one or more external systems;
      send messages to the one or more external systems;
      perform an action in the one or more external systems; and
      trigger a workflow in the one or more external systems.

27. The system of claim 16, wherein the LLM is configured to:
   understand a language of the one or more communication parties of the plurality of communication parties;
   communicate with the one or more communication parties in the language chosen by the one or more communication parties in the multiparty communication; and
   automatically translate messages of a first communication party of the one or more communication parties from a first language chosen by the first communication party to a second language chosen by a second communication party of the one or more communication parties.

28. The system of claim 16, wherein the LLM is configured to orchestrate a plurality of dialogues of one or more subsets of the plurality of communication parties as part of the same conversation associated with the multiparty communication.

29. The system of claim 19, wherein the processor is further configured to instruct the LLM, in the text input prompt, to perform one or more of the following:
   add a communication party to the plurality of communication parties based on one or more of the following: a milestone in the scenario, an external event, a request from a further communication party, a requirement for information that is not available in the text input prompt or among the plurality of communication parties, and a demand provided in the scenario and inferred by the LLM;
   based on the text input prompt, send messages to systems in control of the plurality of communication parties such that the communication party is invited to join the plurality of communication parties;
   drop the communication party of the plurality of communication parties based on one or more of the following: the milestone in the scenario, the external event, the request from the further communication party, a request from the communication party to be dropped, and the demand provided in the scenario and inferred by the LLM; and based on the text input prompt, send further messages to the systems in control of the plurality of communication parties such that the communication party is dropped from the plurality of communication parties.

30. A method for providing multiparty communication using a large language model (LLM), the method being implemented by a computer system, the method comprising:

receiving input messages from user devices associated with a plurality of communication parties participating in a scenario, the LLM being configured to understand the scenario;

generating a text input prompt for the LLM, the text input prompt being generated based on a scenario template, wherein the scenario template includes rules to:

organize the input messages based on the scenario, wherein the plurality of communication parties and the LLM are assigned roles as participants in the scenario; and instruct the LLM to analyze text input prompts and compute response outputs of the LLM as defined by an assigned role of the LLM in the scenario, the text input prompts including the text input prompt;

wherein the scenario template includes:

an activity in which the LLM and the plurality of communication parties are to be participating;

a number of communication parties of the plurality of communication parties;

a reference to the scenario, the scenario providing a context for the activity, wherein the LLM is configured to understand the scenario based on one of the following: pre-training of the LLM, fine-tuning of the LLM with additional training data, and by incorporating additional data into the text input prompt using Retrieval Augmented Generation;

the roles of each of the plurality of communication parties assigned based on the scenario;

the assigned role of the LLM assigned based on the scenario and the activity;

a first syntax structure used to structure the input messages from the plurality of communication parties and assign the input messages based on the roles in the scenario;

a second syntax structure used by the LLM to structure a response output of the LLM to identify a content and desired recipients of the output messages to be sent on behalf of the LLM; and further rules on an action to be taken by the LLM when the LLM is requested to provide information that is not included in the text input prompt, wherein the further rules include generating a message to request the information from a communication party of the plurality of communication parties, wherein the communication party of the plurality of communication parties is expected, based on a role of the communication party of the plurality of communication parties or the rules in the scenario template, to have the information;

sending the text input prompt to the LLM, the LLM analyzing the text input prompt to compose the response output of the LLM, the response output including one or more messages to be sent to one or more communication parties of the plurality of communication parties and multiparty communication instructions, wherein the LLM is configured to:

recognize that a subset of the plurality of communication parties is communicating with each other directly;

based on the recognition, refrain from intervening in the multiparty communication between the subset of the plurality of communication parties; and orchestrate a plurality of dialogues of one or more subsets of the plurality of communication parties as a part of the same conversation associated with the multiparty communication;

analyzing the response output of the LLM, based on a syntax structure provided in the scenario template for the LLM, to generate, based on the one or more messages, output messages to be sent to the one or more communication parties of the plurality of communication parties, the one or more communication parties being identified by a role of the one or more communication parties in the response output of the LLM;

based on the multiparty communication instructions, adding a tag to at least one output message of the output messages;

based on the multiparty communication instructions, sending the output messages to the user devices associated with the one or more communication parties of the plurality of communication parties from a communication endpoint representing the LLM in the assigned role of the LLM in the scenario;

analyzing prior messages, the prior messages including messages from the LLM, to determine when an attention of one or more of the plurality of communication parties is required and cause a notification to be sent to the one or more of the plurality of communication parties; and repeating operations in a further cycle each time a further input message is received from the one or more communication parties of the plurality of communication parties with the prior messages, the prior messages being included as the input messages in a further text input prompt following the scenario template.

* * * * *